Aug. 7, 1956
R. R. EBY ET AL
2,757,600
BARREL KNOT TYING MECHANISM FOR AUTOMATIC BALERS
Filed March 31, 1953
10 Sheets—Sheet 5
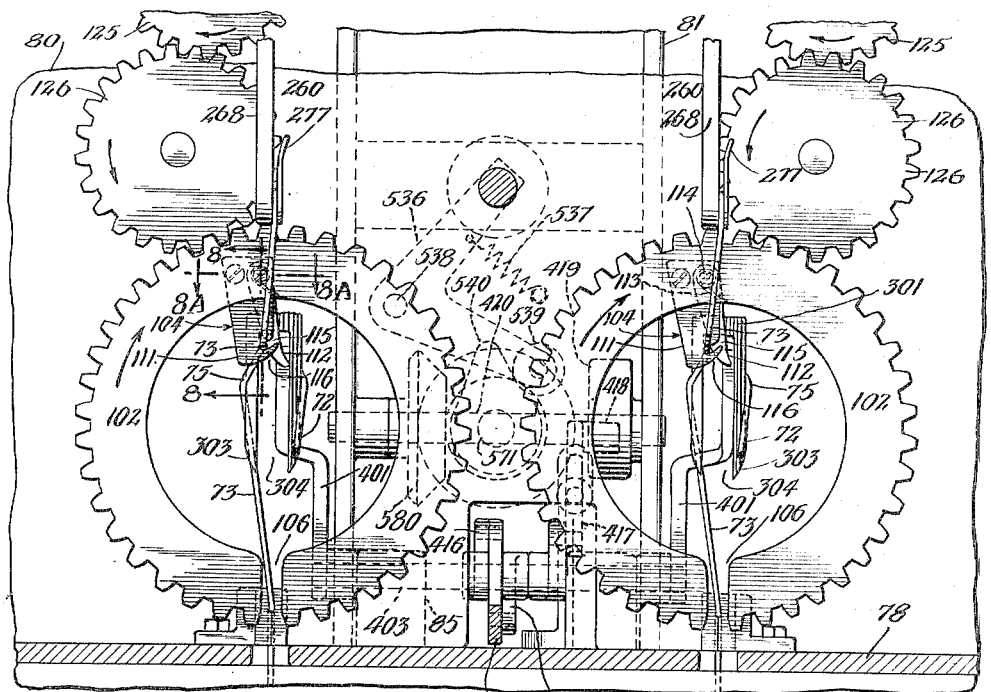
Fig. 6.
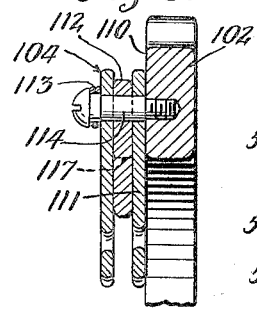
Fig. 8.
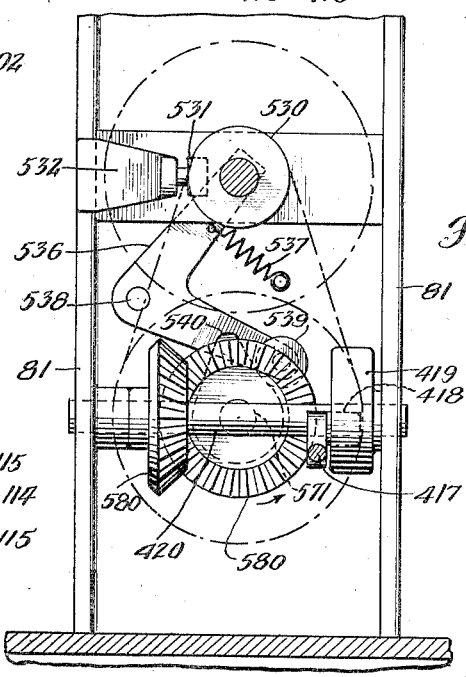
Fig. 7.
Fig. 8A.
Inventors:
Richard R. Eby
John P. Tarbox
By Richard E. Babcock Jr.
Attorney Aug. 7, 1956  R. R. EBY ET AL  2,757,600
BARREL KNOT TYING MECHANISM FOR AUTOMATIC BALERS
Filed March 31, 1953  10 Sheets-Sheet 6

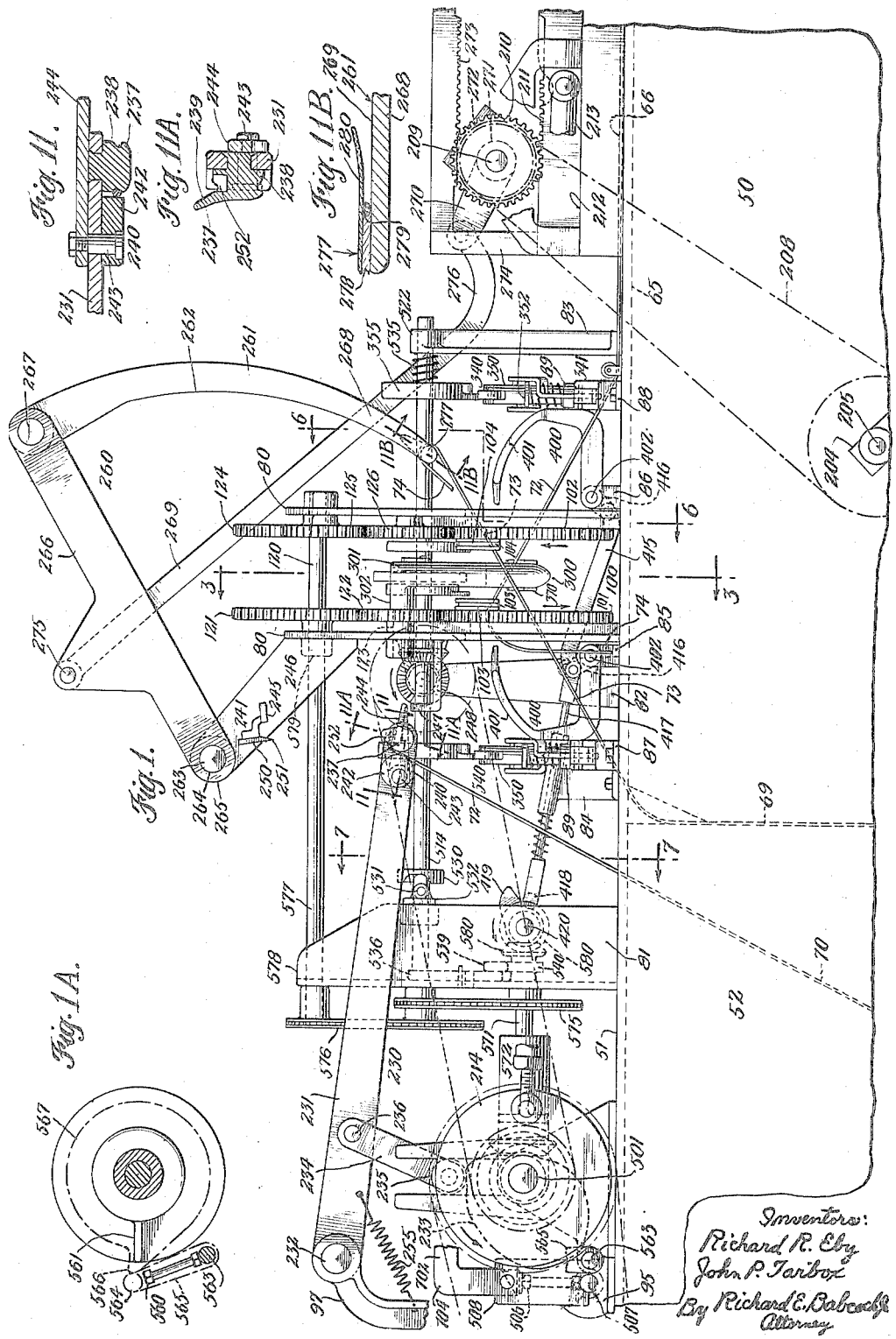

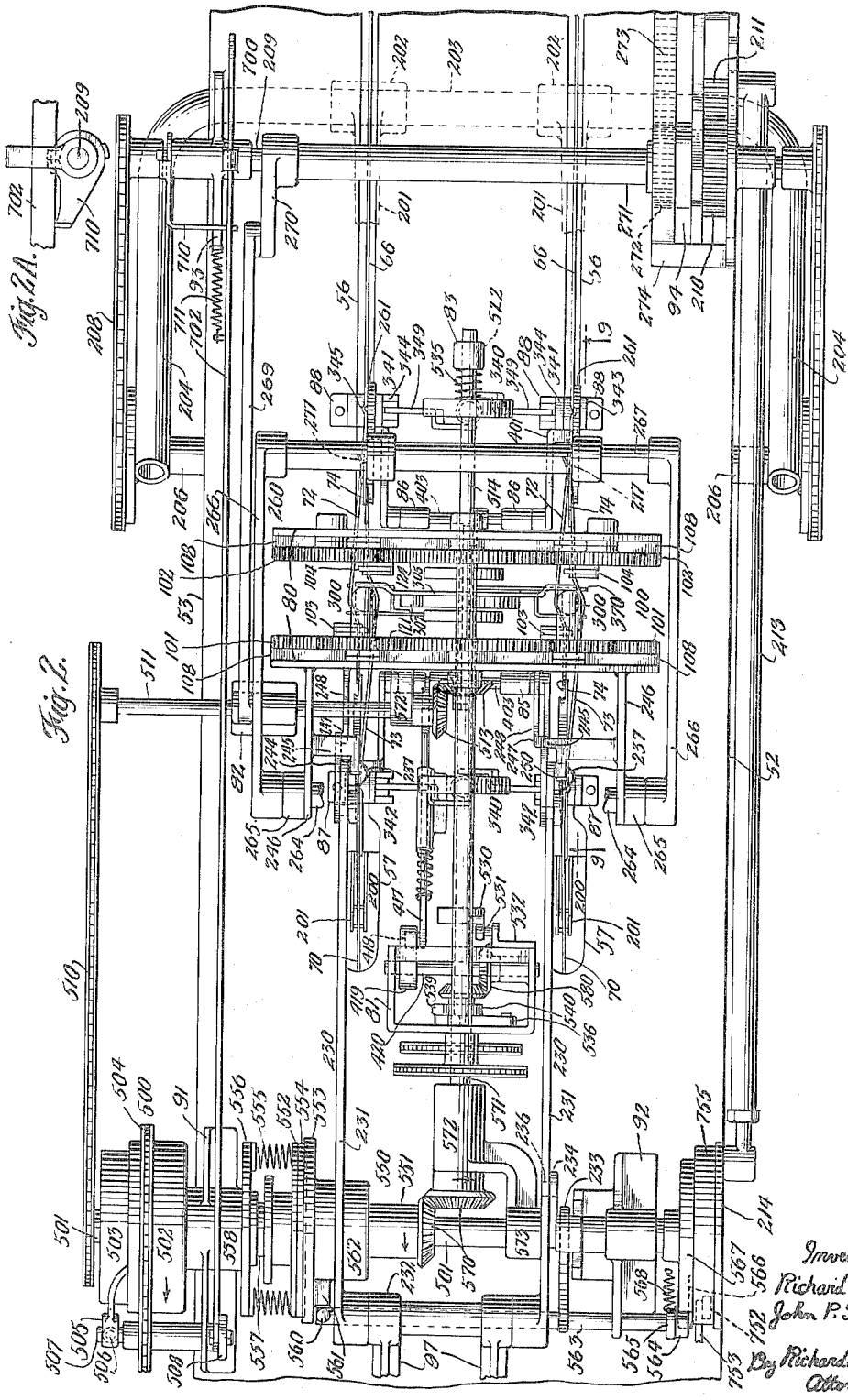

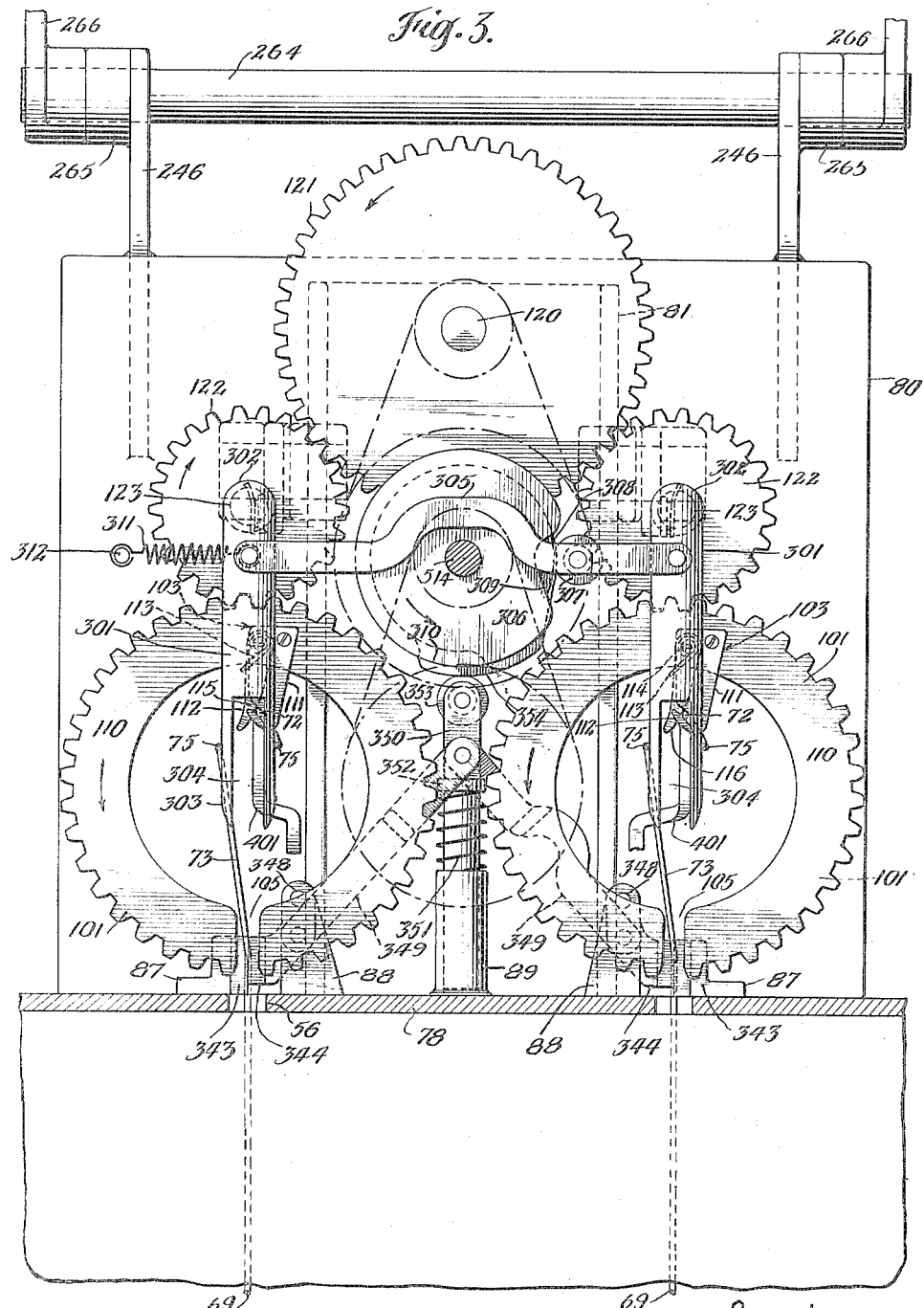

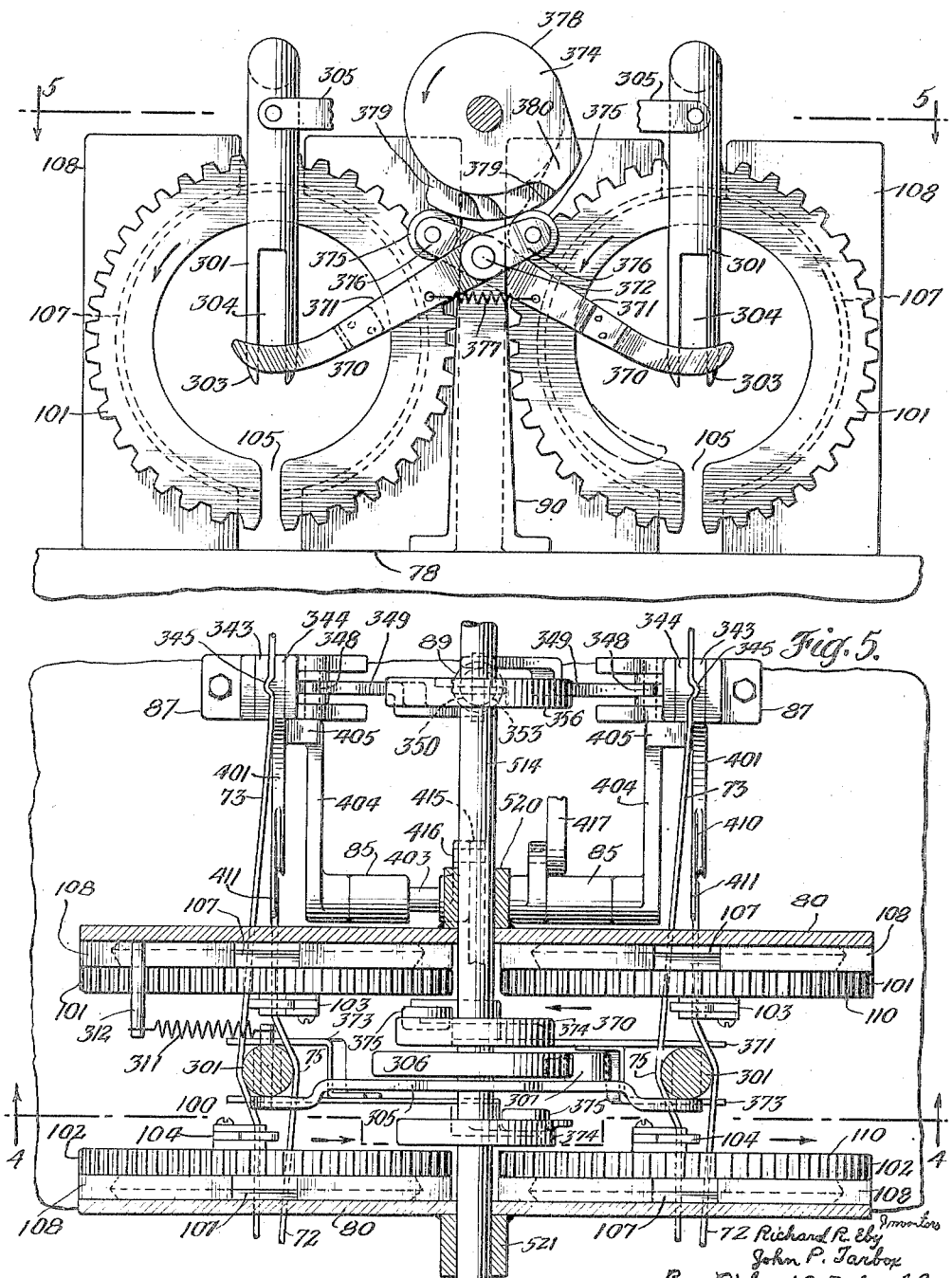

Inventors:
Richard R. Eby
John P. Tarbox
By Richard E. Babcock, Jr.
Attorney

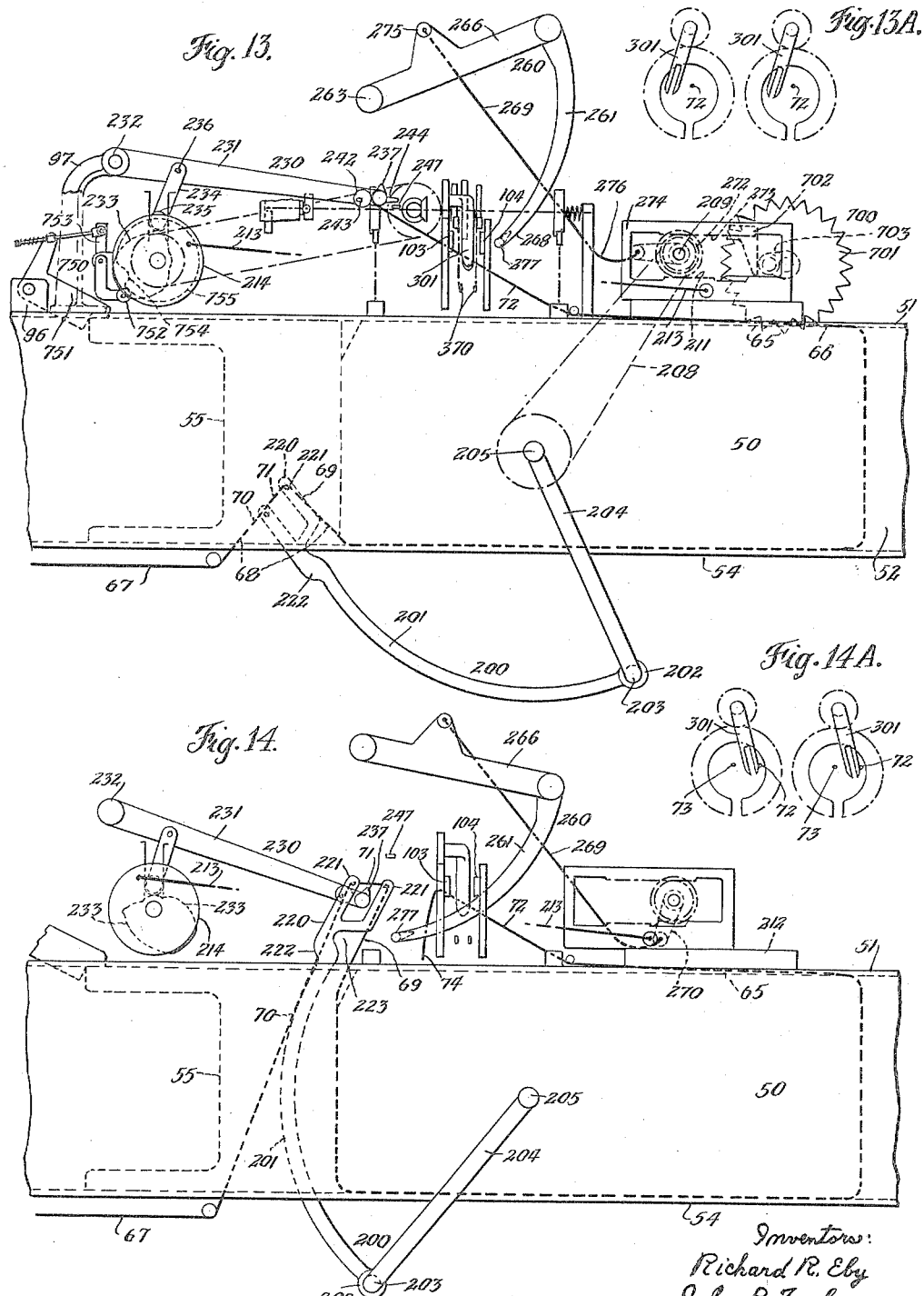

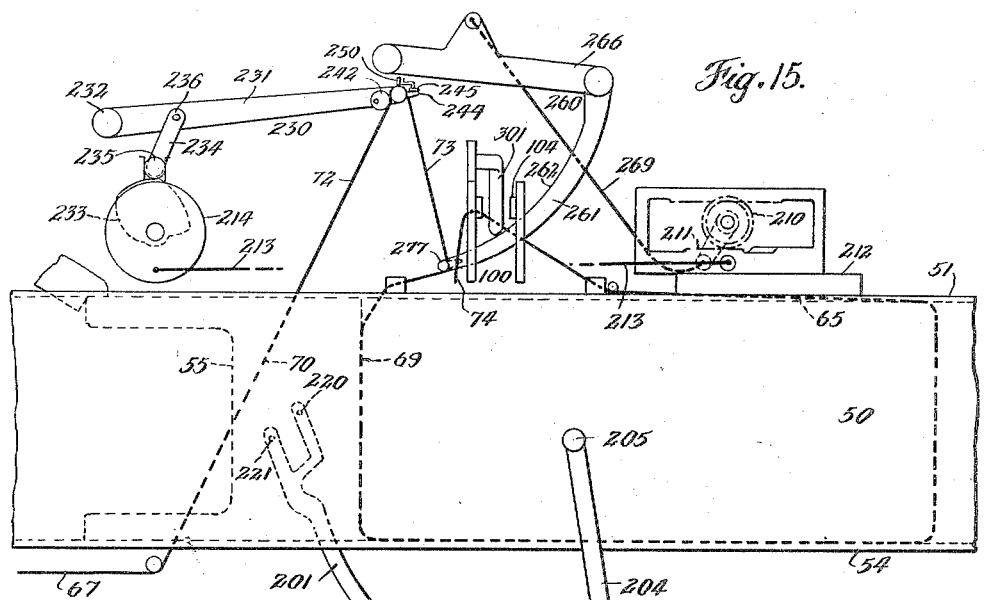
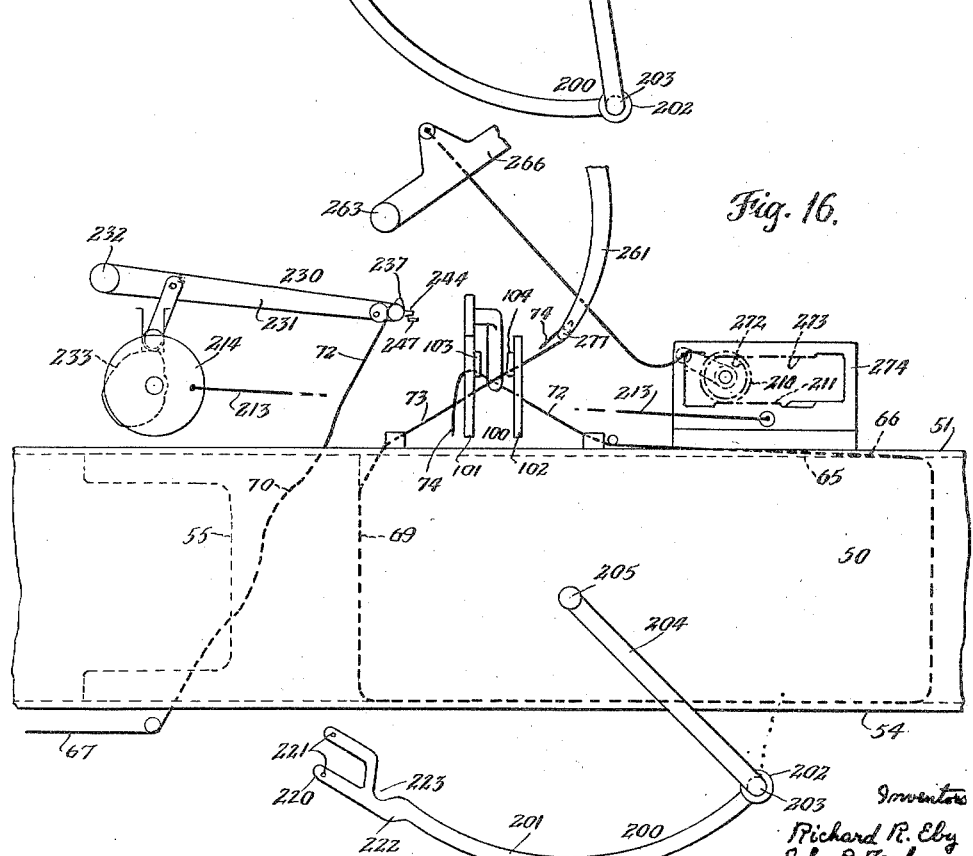

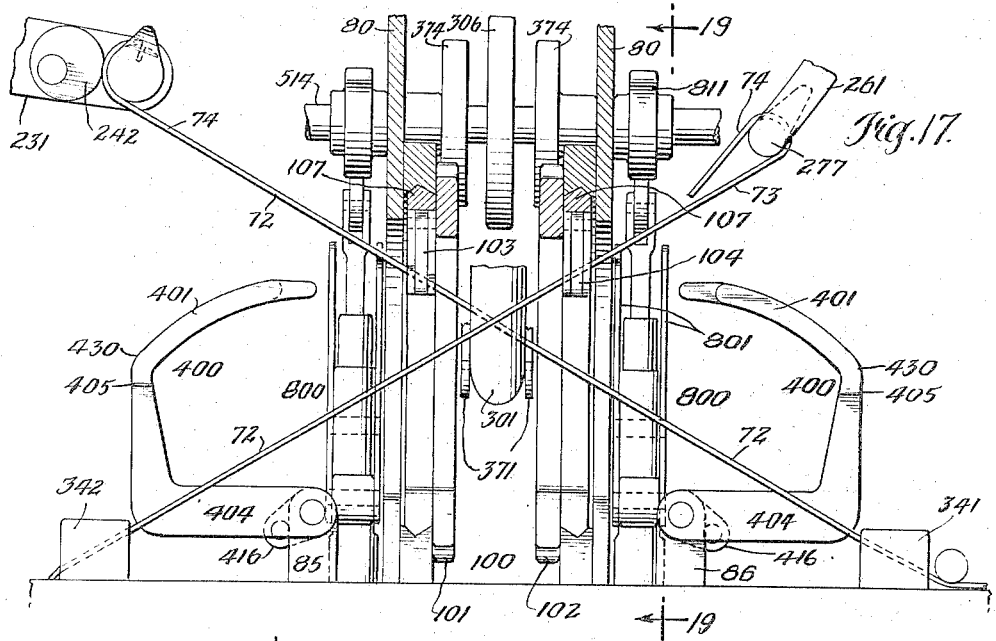
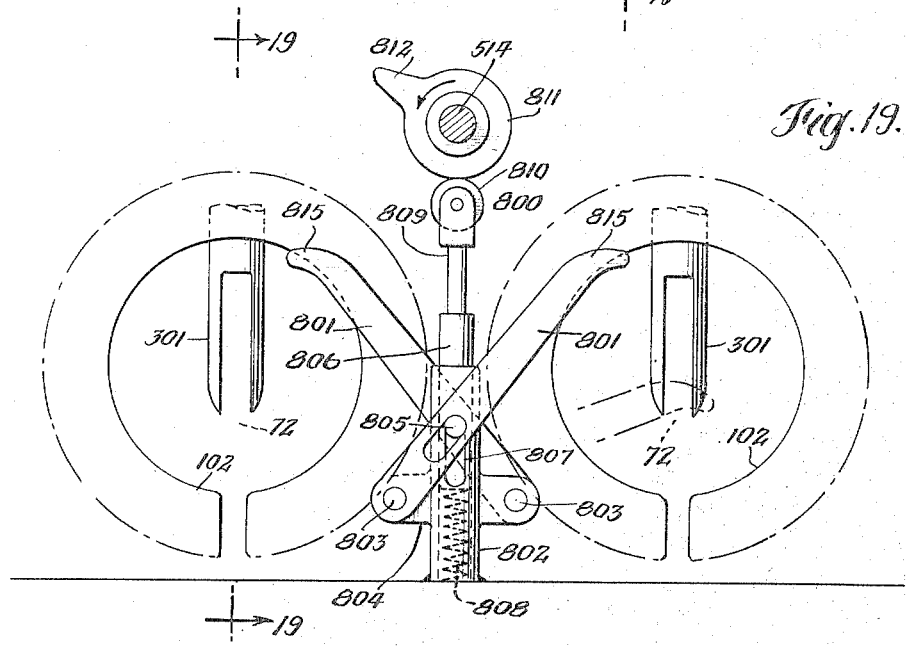

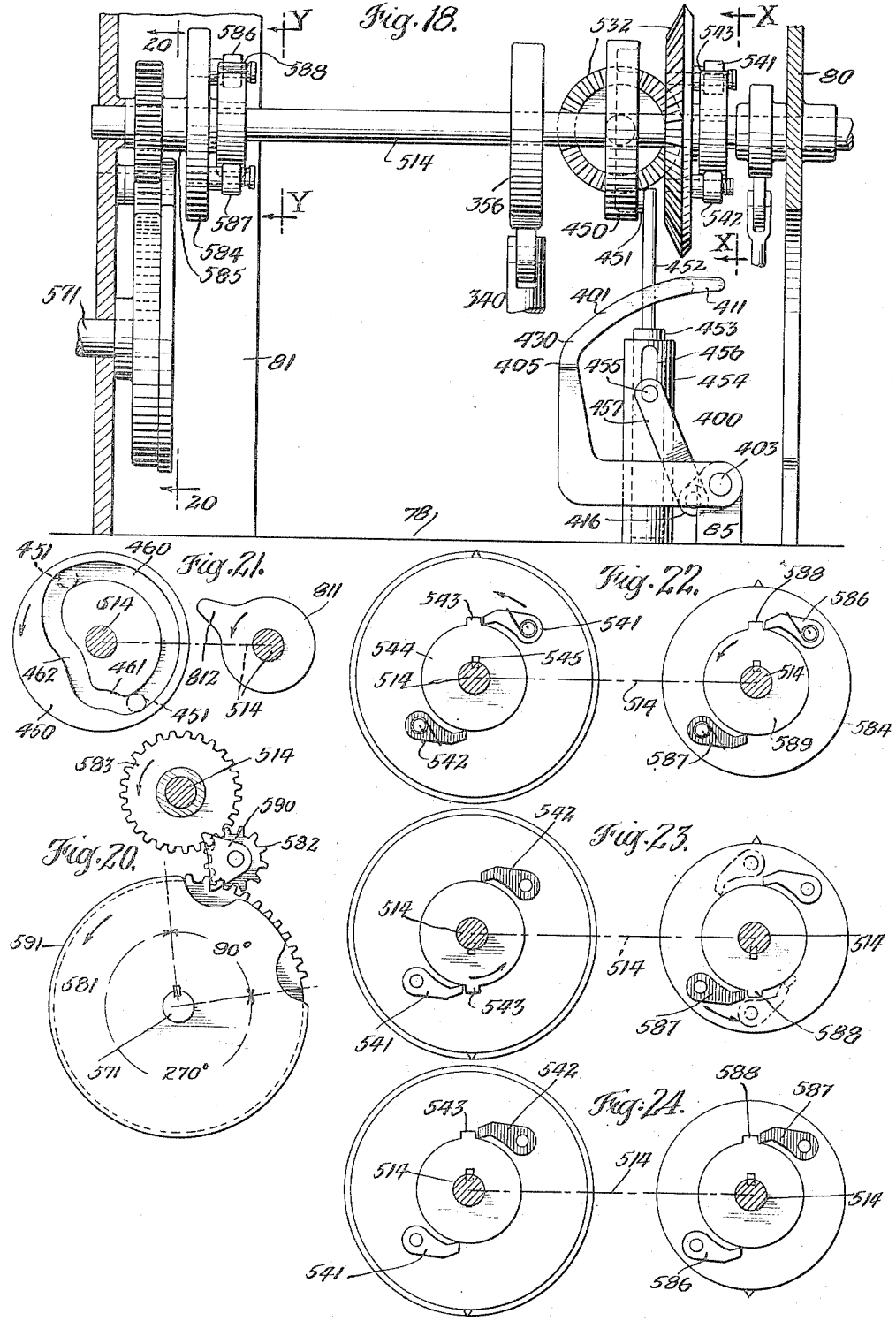

United States Patent Office 2,757,600
Patented Aug. 7, 1956

2,757,600

BARREL KNOT TYING MECHANISM FOR AUTOMATIC BALERS

Richard R. Eby, Ephrata, and John P. Tarbox, Philadelphia, Pa., assignors, by mesne assignments, to Sperry Rand Corporation, New Holland, Pa., a corporation of Delaware Application March 31, 1953, Serial No. 345,866

50 Claims. (Cl. 100—23)

This is a tier of the underlay type inasmuch as both of the strands which are to be tied together are laid in the tying mechanism by passing them upwardly into the mechanism from spaces beneath it. In other words they are passed between the side of the bale being formed and the mechanism at large when laid in place for the mechanism to form the knot.

Among the several objects of the invention a prominent one is the achievement of a barrel knot tier utilizing pairs of rotated peripherally slotted hollow gears to achieve the wrapping of the knots.

Another prominent object is the incorporation of such a barrel knot tier in the tying mechanism at large for an automatic packaging machine, particularly an automatic hay baling machine.

These and other objects of the invention are attained through effecting the lay of the twine within and under the control of the hollow wrapping gears through the coaction of needle means which projects the twine through the bale case about the rear end of the bale, on the one hand with free end metering and cut off means through the action of which the lay of the first free end strand is achieved by the bale itself, and on the other hand through the coaction of the needle means with a shuttle device operating through the hollow gears themselves to effect the lay of the second free end strand; by positioning of the strands for the knotting operation per se through the provision of bale case clamps coacting with the strand engaging means of the hollow wrapping gears to hold the tie about the bale and anchor the free end strands while the knot is being tied, by spreading the strands apart where juxtaposed within the wrapping gears jointly to stabilize the knot during its formation and to provide for the ready insertion of the terminal ends at the center of the knot, and by utilizing strand under-rests or supports in the region of their juxtaposition to maintain and position the knot being formed substantially on the axis of the wrapping mechanism; through the use of inserters for the terminal ends mounted and operated independently of the wrapping gears; by providing a positive means for stripping the completed knot from the mechanism; and by effecting a co-ordination of these several means in their entirety through primary and secondary timing devices which are synchronized with the bale forming operations of the baler and under the control of bale-length metering means.

In the accompanying drawings are shown two embodiments of the invention, a principal embodiment and a modification. The principal embodiment is shown in Figures 1 to 16 while the modification is the subject of Figures 17 to 23.

As to the principal embodiment—

Figure 1 is a side elevation of the mechanism at large as applied to the top of the bale case of an automatic baler.

Figure 1A is a detailed section elevation of a part of the secondary timing mechanism shown in Figures 1 and 2.

Figure 2 is a top plan view of the machine.

Figure 2A is a detailed elevation of a control restoring device shown in plan in Figure 2.

Figure 3 is a transverse section on line 3—3 of Figure 1 looking in the direction of the arrows rearwardly, the view showing the rearwardly located hollow wrapping gears, the train of gears through which they are driven, the rearwardly located bale case clamps, the spreader devices and the means for operating them, but omitting the adjacent and coacting strand under-rests for the sake of clarity.

Figure 4 is a partial transverse section taken in substantially the same plane as Figure 3, but in which only the rearwardly located hollow wrapping gears are shown with the coacting strand spreaders per se, the remaining elements in Figure 3 being omitted the better to show the strand under-rest devices which coact with the spreader devices. The view is taken on line 4—4 of Figure 5.

Figure 5 is a horizontal cross-section of the mid-portion of the knot tier per se taken approximately on line 5—5 of Figure 1.

Figure 6 is a third transverse section taken on line 6—6 of Figure 1 also looking rearwardly, and this time showing the two forward hollow gears of the wrapping mechanism and their associated engaging means, the rearward inserter devices, and in dotted lines certain rearwardly located elements of the secondary timing means, to wit the restoring means utilized to make ready the mechanism for the next succeeding knot of any series, but omitting other rearwardly located devices for the sake of clarity.

Figure 7 is an enlarged sectional view taken on line 7—7 of Figure 1 looking in the direction of the arrow and showing in full lines the restoring device appearing in Figure 6.

Figures 8 and 8A are respectively vertical and horizontal cross-sections of the wrapping clamps carried by the wrapping gears of the wrapping mechanism, taken respectively on lines 8—8 and 8A—8A of Figure 6.

Figure 9:
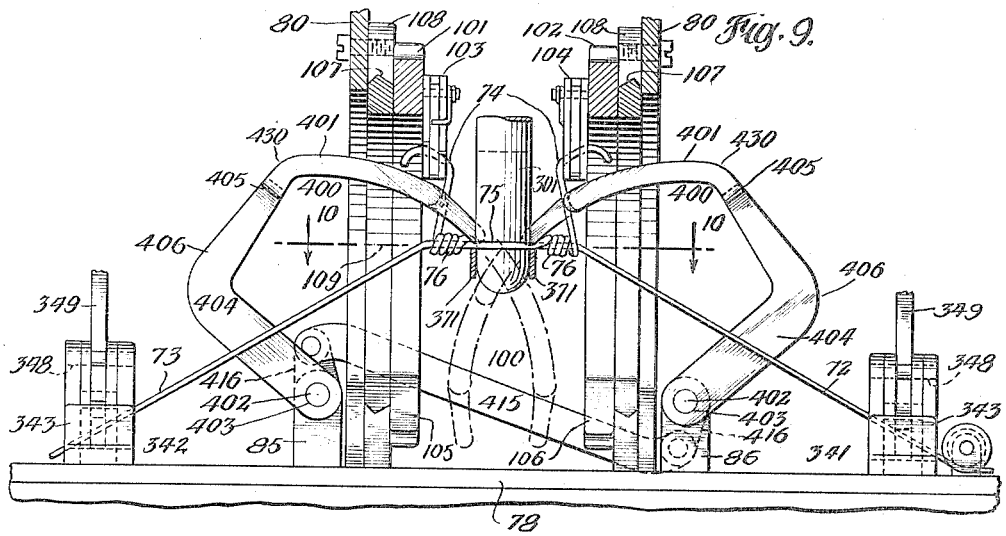

Figure 9 is a similar vertical longitudinal section of the tier mechanism per se taken on line 9—9 of Figure 2 looking in the direction of the arrows, a line substantially on the axis of the right hand wrapping device, showing the coacting pair of hollow wrapping gears in section and the free end strands laid in, ready to be knotted; the strand spreading and under-rest devices in action, the last wrap of a four-wrap knot just nearing completion, and the coacting inserters just reaching engagement with the terminal ends of the free end strands and about to project them between the spread strands at the center of the knot, the bale case clamps retaining their hold the while, upon the body portion of the tie.

Figure 10:
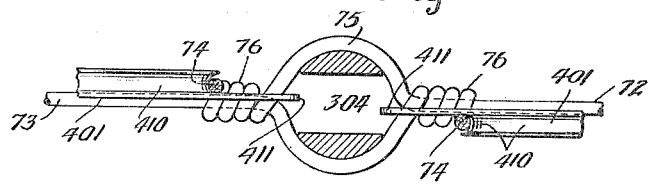

Figure 10 is a horizontal section substantially on line 10—10 of Figure 9 showing in plan the appearance of the knot being formed in the stage depicted in Figure 9, with the ends of the inserters in engagement with the terminal ends just described.

Figures 11 and 11A are respectively horizontal and vertical sections of the hook, and associated clamping means associated with the free end strand metering means, and taken respectively on lines 11—11 and 11A—11A of Figure 1.

Figure 12:
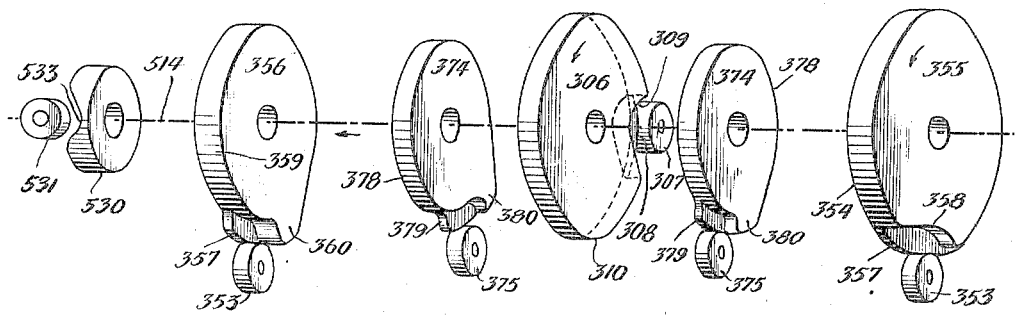

Figure 12 is a diagrammatic perspective of the series of cams associated with primary timing mechanism in their co-ordinated control of the various subordinate mechanisms and devices entering into the knotting mechanism per se. The approximate time relationship of the cams is indicated by the relative angular positions of the cams upon the common axis from which they are operated.

Figures 13 to 16 are diagrammatic views depicting various stages of the operation of the mechanism at large as follows: Figure 13—showing the positions of the parts particularly the positions of the needles and shuttles of the strand laying mechanism as they first get under way; Figure 14—the positions of the parts as the needles reach their extreme upper limits of movement, particularly the relative positions of the coacting free end metering and cutting means and the shuttle means for engaging and laying the second strand; Figure 15—the relative positions of the needles and the shuttle means at the time the free end metering means completes the metering of the free end lengths and is ready to cut them apart to form two free end strands, the one to constitute the strand laid by the shuttle means and the other to constitute the first strand laid in connection with the next succeeding bale; and Figure 16—showing the same parts in their rest positions, the lay of the second strand as completed by the shuttle means, and the free end strand for the next succeeding bale still in the hold of and positioned for the next succeeding bale by the metering device.

Figures 13A and 14A are respectively diagrammatic transverse elevations of the positions of the spreaders obtaining in the stops diagrammed in Figures 13 and 14.

As to the modification:

Figure 17 is a sectional side elevation in the vertical plane of the axis of one pair of wrapping gears showing the parts of the tying mechanism per se and a pair of stripping devices.

Figure 18 is an elevation to the same scale adapted to be matched with the left of Figure 17 showing the connections of the primary and secondary driving and timing mechanisms to the timing control shaft.

Figure 19 is an elevation taken on line 19—19 of Figure 17 showing one of the two stripping devices.

Figure 20 is a sectional elevation taken on line 20—20 of Figure 18 showing the gear connections between the secondary timing mechanism and the timing control shaft.

Figure 21 is a diagrammatic view showing the relative rotational positions of the inserter control cam and the stripper control cam on their control shaft.

Figures 22 to 24 are diagrammatic views of the lost motion driving connection between the primary and secondary timing mechanisms and the timing control shaft, each diagram comprised of the two such connections; the one on the left that forms the primary timing mechanism viewed from line X—X of Figure 18, and that on the right the drive from the secondary timing mechanism as viewed from line Y—Y of Figure 18. These views show both the detailed construction of the drives and the timing relationship between them in different stages.

The mechanism at large is designed to simultaneously effect two ties about a bale, and most of the auxiliary mechanisms and devices entering into it are duplicated on opposite sides. Therefore, while both sides are shown in the principal views for the most part the description will be applied to but one side only.

The bale case on which the tying mechanism at large is mounted and in connection with which it is used, is designated generally 50, its top 51, its right hand side 52, its left hand side 53, and its bottom (see the diagrammatic view) 54. In the case reciprocates the baling plunger 55 shown in dotted lines in the diagrammatic views but not appearing in the other views. This plunger is provided with a releasable connection with its crank and connecting rod driving means (not shown) in accordance with a well known practice so that it may be caused to dwell in contact with the rear end of a newly formed bale during the period of one revolution of its driving crank in order to facilitate the tying operation.

The freshly completed bale about which the tie is to be made as shown in dotted lines in Figure 1 and the diagrammatic views, is designated 65. The loop extended about the bale is designated 66, the spool strand from which this tie has been drawn in process of forming the bale 67 (the spool itself is not shown), the needle loop 68, its bale strand 69, its spool strand 70, its bight portion 71, the first to be laid free end strand to enter the knot 72 (the strand which is derived from spool strand 70), and the second to be laid free end strand to enter into the knot 73 (the strand which derived from bale strand 69 of the needle loop), the terminal ends of the two free end strands which enter the knot are designated 74, and the spread central strands of the knot 75 and its several wraps 76 (see especially Figs. 9 and 10 in connection with the other figures).

As clearly appears in Figures 1 and 2, the various combined devices and subsidiary mechanisms of the bale tying mechanism at large are mounted for the most part, from the top 51 of the bale case as a base. A common base plate 78 may be utilized if desired, as indicated in Figures 6 and 9. Each of the mounting plates, pedestals, bearing brackets, etc. entering into the supporting framework of the mechanism is anchored to the base by welding or bolting. Such are the parallel transversely extending expansive mounting plates 80 which mount and journal the majority of the devices entering into the tier mechanism per se, and the bearing pedestals 81, 82 and 93 which afford auxiliary bearings for the various drives which enter the tier mechanism per se. So mounted and anchored also are the respective bearing brackets 84, 85 and 86 of the inserter mechanism, the mounting brackets 87 and 88 of the bale case clamps, and in the central plane see Figures 3 and 4, the central supports 89 of the bale case clamp operating mechanism and 90 of the strand under-rest devices. Thus also, are mounted and anchored bearing brackets 91, 92 which journal the principal elements of the primary and secondary timing mechanism and the bearing brackets 93 and 94 which journal the shuttle and needle operating drive shafts. Finally so mounted and secured are the bearing brackets 95, 96 (see Figure 11) of the timing mechanism control and 97, the pivotal mount of the free end metering and cutting mechanism. Together these constitute the framework of the mechanism at large.

In effecting the tying of the barrel knot, the free-end strands to be knotted together, 72, 73, are laid in the mechanism in X-formation, as clearly appears in Figure 1 and Figure 16. That portion of the mechanism at large into which they are received and through which the wrapping operations forming the barrel of the knot are performed is the wrapping mechanism 100 which appears in elevation and longitudinal section respectively in Figures 1 and 9. The principal elements of this wrapping mechanism are a pair of longitudinally spaced, hollow, peripherally slotted wrapping gears 101 and 102 really ring gears and a pair of yieldably engaging free-end clamps 103, 104 carried from the inner peripheries of these gears respectively at points approximately diametrically opposite the slots 105 and 106 in their peripheries. This wrapping mechanism is rotatably supported from spaced plates 80 by means of hollow journals 107 which are slotted complementally to the gears 101, 102 and respectively borne in anti-friction bearings 108 also slotted at their bottoms to communicate with bale case slots 56 and which are secured, those of gear 101 to the rearward mounting plate 80 and those of the gear 102 to the forward mounting plate 80, the securement being by any suitable means such as the machine screws shown. The journal rings 107 have cylindrical interior peripheries generally in extension of the cylindrical inner peripheries of the gears 101, 102, but their outer peripheries and the inner peripheries of the bearing plates 108 are complementally V-shaped in cross-section whereby the plates not only journal the gears 101, 102 but also retain them axially in place. The journalling is on the juxtaposed inner faces of the plates 80 and upon a common axis 109. Bearing plates 108 are in segmental sections whereby the gears can be the more readily mounted and demounted. The slots 105, 106 and their complements in the journals 107 applying when the mechanism is at rest, lie at the bottom and in the vertical plane of the bale case slot 56 through which the bale is tied and its enlarged head 57 through which the needle operates to project bale stand 69 cross the rear end of the bale.

The yieldably engaging free-end strand clamps 103, 104 receive the strands 72, 73 from the strand-laying devices presently to be described and while at rest with the gears 101, 102 which mount them, retain the strands in the X-formation shown in Figures 1 and 16. They retain their holds in the strands during the wrapping operation of the gears and yieldably feed the strands to the wraps as they are made. As shown, particularly in Figures 3 and 5 and 8 they are secured by appropriate mounting screws directly upon the inner faces 110 of these gears just inside the inner peripheries. The clamps are composed of interleaved plates and comprise a pair of relatively fixed jaws 111 and a single relatively movable jaw 112 which operates between the fixed jaws 111 and is urged toward them by a tension spring 113 which is carried from a pintle 114 upon which the movable jaw 112 is mounted at the upper, anchored end of the fixed jaw 111. Appropriate spacing means between the fixed jaws 111 which space them apart with sufficient tolerance to permit free movement of movable jaw 112 between them, is of course provided between the upper ends of the movable jaws in the region where they are secured to the face 110 of the gear. The fixed jaws are provided with downwardly (more accurately, radially inwardly) inclined strand-receiving slots 115 which open on the side next the movable jaw. The lower ends of the jaws (those more radially inward) are divergently flared as indicated at 116, the more readily to receive a strand presented to the clamp, and part the jaws to enter the strand into the receiving slots 115. The tension of spring 113 may be adjusted through any suitably provided form of adjusting means, to enable the jaws to be readily parted by a strand pushed upwardly against the diverging ends 116 when the strand reaches the mouth of the slots 115 to press the strand into the slots. All sharp edges of these jaws are to be removed by careful rounding and polishing in all regions where the strand is engaged, particularly in the divergent ends 116 and the slots 115 (see Figures 3, 8 and 8A). The slots 115 themselves are convergent from mouth to bottom, being of a maximum dimension somewhat greater than the maximum dimension of the twine used and flared at the mouth, and preferably of a minimum dimension at the bottom somewhat less than the minimum dimension of the twine whereby to impose a moderate pressure on the sides of the twine in the slots, slightly altering its cross-section and regulating its frictional drag through the slots as the wraps are being made. This action and the rounded and smoothed sections of the jaws, is clearly depicted in Figures 8 and 8A. The approach of the fixed and movable jaws toward each other when a strand is fed all the way out of the slot and the jaws are empty, is limited by the engagement of the movable jaw with the spacing means 117 between the fixed jaws 111 or other well known means. Comparing the showings of the free-end clamps 103, 104 in Figures 3, 5 and 6, it will be seen that the clamps 103 are arranged in a plane slightly inside of the axial vertical plane (i. e. toward the center of the bale case) of the rear pair of gears 101 while the front free-end clamps 104 are arranged slightly outside of that plane, having reference to the position of the respective strands 72 and 73 shown in the grip of the jaws. The opposite is true of the wrapping mechanism 100 in the opposite side of the bale case for a reason which will presently appear.

The driving means for the wrapping mechanism 100 and its free-end clamps consist of two different trains of gears commonly emanating from a common driveshaft 120 in the longitudinal plane of symmetry of the mechanism at large well above the horizontal plane of the wrapping gears 101, 102, but like them journaled in the mounting plates 80. The one train applying to the rearward gears 101 is most clearly shown in Figure 3 to embody a common gear 121 on shaft 120 and an idler 122 borne from a stud shaft 123 affixed to the rearward plate 80 and directly engaging the teeth on the outer periphery of the hollow gear 101. The other train is comprised of a similar central main gear 124 and two idlers 125 and 126 intervened between the main gear 124 and the hollow gear 102 (see especially Figures 1 and 6), whereby the gears 102 are driven oppositely to gears 101, all as shown by the applied arrows. Appropriate stud mountings are provided for these latter idlers on the forward plate 80. The gearing from shaft 120 to wrapping gears 101, 102 is on a one-to-one basis, the main gears 121 and 124 and the wrapping gears having the same number of teeth and the same diameter. The slots 105, 106 in the gears are of a width approximately that of the tooth spacing, whereby the pinions readily bridge the slots without interruption in the even rotation of the gears while the wrapping is under way. The tooth width and hence the slot width is sufficient to permit a completed barrel knot to pass through it.

The strand-laying means comprises three coacting mechanisms or devices, the first needle mechanism 200, the second the free-end metering and cutting mechanism 230, and the third the shuttle mechanism 260. All strands whatsoever entering into the tie about a bale, of course, emanate from the spool (not shown) by way of spool strand 70. However, those which are to constitute free-end strands 72 and 73 owe their segregation primarily to the needle mechanism 200 through its engagement with the spool strand 70 and its projection of the needle loop 68 through the bale case to present its opposite sides and its bight above the bale case to be engaged and operated upon by the mechanisms 230 and 260.

The needle mechanism comprises needle 201 carried as usual by a rigid mounting 202 upon the bight 203 of a needle yoke 204 oscillatable about an axis 205 comprised of bearings 206 projected respectively from the opposite side walls 52, 53 of the bale case 50. The yoke is driven by a sprocket and chain connection 208 from an auxiliary driveshaft 209 carried from the bearing brackets 93 and 94. The shaft is oscillated as in the case of copending application Serial Number 268,424, filed January 26, 1952, in the name of Nolt et al. through a gear 210 connected with the shaft (see particularly Figures 1 and 2), which gear meshes with a rack 211 underlying it, which rack is reciprocated on slide bearings 212 by means of a pitman 213 driven from crank disk 214 of the primary timing mechanism 500. Gear 210 and rack 211 are mutilated sufficiently to bring about a momentary dwell of needles 201 in their uppermost position, as can clearly be seen from Figure 1.

The point 220 of the needle is bifurcated and widely and deeply slotted between the bifurcations (see particularly Figures 13 and 14). The upper extremity of the bifurcation is provided with a strand-engaging roller or equivalent guide 221. The point 220 connects with the main body 201 of the needle by a rearward offset 222 which supports the bifurcations in the region of the base of the rearward bifurcation, whereby there is formed below them a relatively deep bay 223. Thereby as the needle loop is projected through the bale case and above its top, as shown in Figure 14, the rollers 221 at the ends of the bifurcations present the bight 71 of the needle loop in a free extent substantially horizontally, while the bale strand 69 leads downwardly from the forward roller 221 across the rear end of the bale and the open mouth of the bay 223 which lies well above the top the the bale case, and the spool strand 70 leads downwardly from the rearward roller 221 around the back of the needle body 201, there to join the twine 67 as being drawn from the spool.

The free-end strand metering mechanism 230 engages with the bight 71 presented by the needle as shown in Figure 14, taking charge of the needle loop as the needle is retracted and drawing both of the strand lengths required for the strand-laying operations in the one operation diagrammed in Figure 15. This metering mechanism comprising an oscillable arm 231 borne oscillably on an axis mounting 232 at the top ends of brackets 97 which (as indicated earlier) emanate from the base of the mechanism (see Figure 13). The arm 231 is oscillated against the tension of retracting spring 255 by a cam 233 connected with the primary timing mechanism, the same mechanism from which the crowned disks 214 operating the needle mechanism 200 is connected. This cam 233 connects with the arm 231 through a link 234, the lower end of which is provided with a follower 235 engaging cam 233 and the upper end of which is pivotally connected at 236 to the body of the arm 231. As its forward end arm 231 carries a strand engaging hook 237 whose detailed cross-section is shown in Figure 11A a vertical transverse section and in Figure 11 a longitudinal section. The main body of the hook is a short cylinder or twine disk 238 fixed to the extremity of the arm 231 against rotation and bearing on its outer face the outwardly flared mouth 239 of the hook. This is borne in the same vertical plane in which the bight 71 of the needle loop is presented whereby the point 239 when arm 231 is moved downwardly, may ratchet past the bight 71 and when arm 231 moves upwardly engage the bight on its upper side and direct it to the periphery of the disk 238.

Coacting with the hook 237 are a twine-clamping device 240 and a twine cutting device 241. The clamping device comprises an eccentrically mounted clamping disk 242 rotatable on an axis 243 carried by the arm 231 just rearwardly of the hook 237, which axis is rotatable through an operating arm 244 connected with the axis 243 on the opposite side of arm 231 from the cam disk 242. The spacing is such that when arm 244 is depressed, cam disk 242 will engage the bight of the twine which lies over the twine disk 238 and jam it in place fixedly between itself and the twine disk, retaining it the more tightly in place the greater tension applied to the spool strand becomes as the bale takes strand 70 along with it to loop it about its forward end. A lug 245 mounted on an arm 246 rigidly connected from the rear mounting plate 80 is in a position to be engaged by lever 244 when arm 231 is in its upper extreme of movement (see Figures 1 and 15) while a lug 247 also supported from the rearward plate 80 through bracket 248 lies in a position to engage the underside of lever 244 when arm 231 passes downwardly, thereby to release the clamp when arm 231 starts its movement from the rest position shown in Figure 1 to engage the bight of the next loop presented by the needle, as appears in Figure 14. Appropriate friction means or spring detents, neither of which need be shown here, are provided if need be in supplement to normal friction of the parts to retain the clamp 240 in its respective clamping and releasing positions.

The cutting device 241 is comprised of a vertically disposed cutting blade 250 anchored to the same rearwardly extending bracket 246 which supports the lug 245 and having its cutting edge 251 presenting downwardly and on the arc of movement as extended of the center of the hook twine disk 238. The twine disk, as clearly appears in the sections of Figures 11 and 11A, is radially slotted from its upper periphery downwardly toward its center as indicated at 252, this slot also lying upon the said arc of movement of the center of the twine disk. The placement of the cutter 250 is at such a height that when the arm 231 of the free-end metering mechanism is at its very greatest metering height just after the clamp 240 has been actuated to grip bight 71 at is juncture with spool strand 70, the bight becomes cut clearly in two and the freed bale strand 69 becomes the immediate free-end strand 73, while the clamped spool strand becomes the next to be used strand 72 as appears in Figure 15.

The coacting shuttle device 260 of the strand laying mechanism is comprised of an arcuate shuttle arm 261 whose upper edge 262 is shaped truly upon a radius from overhead rearwardly located axis 263 constituted by a cross shaft 264 in bearings 265 at the upper extremity of the same pair of brackets 246 which mount the lugs 245 of the metering arm clamps 240 and the cutting devices 241. It is radially held in this radial relation to axis 263 by a mounting arm 266 rigidly connected with the shaft 264 at its rearward end and rigidly connected with the base of the arm 261 (its forward end) through the intermediary of a cross shaft 267. There are provided two shuttle members 261 and two operating and supporting arms 266, one for each of the ties to be made about the bale, as in the instance of the needles 201 and the metering arms 231. The arcuate shuttle arms 261 are at such radial distance from the axis 263, and the location of the axis 263 is in such relationship to the bay 223 of the needles 201 when the needles are in their extreme upward positions, and the inner peripheries of the gears 101, 102 and the free-end strand clamps 103, 104 which they carry, that when the mounting arms 266 of the shuttles 261 are oscillated downwardly, the shuttles 261 pass close to the gears and the clamps of the wrapping mechanism 100, but do not foul them, and the lower or forward extremities 268 of the shuttles reach into the bay 223 of the needles without fouling the needle. This oscillation of the shuttles 261 is brought about through a link connection 269 of one of their mounting arms 266 with the crank arm 270 borne by an oscillable sleeve 271 telescoped freely about the oscillable shaft 209 of the needle mechanism, which telescoping sleeve 271 is in turn oscillated by a gear 272 having a rack connection 273 through frame 274 with the same pitman 213 which reciprocates the rack 212. Necessary clearances are had by offsetting the pivotal connection 275 of link 269 with operating arm 266 and downwardly arching lower end 276 of the link of the crank 270.

Shuttles 261 each bear at their lower or rearward extremities 268, hooks 277 of any usual construction, shown outstandingly in the horizontal cross-section of Figure 11B. A twine receiving disk 278 having a grooved, rounded and smoothed periphery 279 for receiving and frictionally feeding around itself the twine received, is readily secured by brazing or otherwise to the inner face of the top 268 of the shuttle. On the inner face of the disk 278 is secured also by brazing (perhaps welding) the inwardly spaced and forwardly projecting tongue 280 of the hook, which extends along the length of the shuttle body 261 for a little distance. Its connection with the grooved twine disk 278, its main body, and all the brazing and welding are smoothed and rounded (as are all other twine engaging elements of the mechanism at large) to prevent cutting or breaking of the fibers and to eliminate cracks and projections or other formations which may unduly foul or damage the twine fibers. The tongue 280 of the hook, as clearly appears in the transverse section of Figure 11B, as it approaches the twine disk 278 converges closely upon the body of the shuttle end 268, and the thickness of the disk 278 and this spacing of the tongue 280 of the hook from the shuttle end 268 is somewhat less than the minimum diameter of the twine being operated upon, whereby as the twine draws over the disk 278 its section is somewhat thinned, as shown in the transverse section, and there is imposed a frictional drag which enables the shuttle to draw the twine which it is operating upon relatively taut from its bale loop or base end to the hook, whereby the shuttle means may effect the lay of the twine in a relatively taut condition.

Preferably the tongue 280 is flexible whereby to yieldingly engage and retain the twine between itself and the juxtaposed face of the shuttle end 268. Like the parts of the hook, the end 263 has its section rounded and smoothed where the twine may be touched by it.

The arrangement is such that flared tongue 280 of the hook is oscillated in a vertical plane which includes the bale strand 69 as projected above the top of the bale case, as shown in Figure 14, to the end that tongue 280 may ratchet over the taut bale strand 69 and into the bay 223 of the needle, at which juncture the strand 69 becomes hooked behind tongue 280 as the shuttle hook 277 leaves bay 223, as appears in Figure 15, and converts the upper end of the bale strand 69 into the free end strand 73 and draws it forward. Drawing this new strand toward as it recedes, shuttle 261 effects its lay in the forward wrapping clamp 104, the strand being drawn taut through the hook 277 under such tension that as the hook 277 approaches its upper limit of travel, strand 73 is pressed between the fixed and movable jaws 111, 112 of the clamp and slipped into the retaining and feeding groove 115. Earlier the mating free end strand 72 will have been laid in the mating free end strand clamp 103 by the action of the baler in forming the bale, or if the baler is being used for the first time, will have been laid in position by hand.

So laid and while being laid in the X-relationship shown in Figures 1 and 16, the twine is positioned for the operation of knot forming and approximately retained in that position and the ends kept free for appropriate manipulation, by the conjoint action of strand spreading device 300, bale case clamping means 340 and knot under-rest device 370. The strand spreading devices 300 are in the form of vertically extending rods or bars 301 suspended oscillably in the transverse plane of symmetry of the wrapping mechanisms 100 from the same stud shafts 123 which mount the idlers 122 of the rearward gears 101 by means of a sleeve 302 on the upper ends of the spreader bars 301 (see Figures 1, 2 and 3). The stud shafts 123 are located substantially in the vertical plane of the axis of the gears 101, 102 and the axis of the knot to be tied. These spreaders 301 are generally of round or other curvilinear section and their lower ends 303 project a considerable distance below the axis of the gears 101, 102 and still further below the crossing of the X-laid strands 72, 73, as viewed in elevation in Figure 1. The lower ends 303 are provided with a relatively wide and deep slots 304 having sides substantially parallel to the vertical plane of the gear axes and symmetrically disposed as respects it. Ends 303 are tapered and rounded toward the slot walls, as appears in Figure 3 and present a pointed form when viewed in elevation as appears in Figure 1. Spreaders 301 are positioned between the strands 72, 73 as they are laid in the yieldably engaging free end clamps 103, 104 in order to spread the strands laterally apart in the region of their juxtaposition (the region between the regions occupied by the wraps) at the center of their X-form lay, in order to facilitate the insertion between them in this region of the terminal ends 74 of the strands to complete the knot. The region of the center of the X is to become the center of the barrel knot and the terminal ends need be passed between the overlapped strand positions of this central region. The spreader bars 301 are manipulated to spread the lays by means of a transversely extending link 305 (see Figures 2 and 3 whose ends have pivotal connection with the spreader bars 301 at a distance below their suspension axes 123. By laterally shifting this link the spreaders 301 on opposite sides of the mechanism at large can be simultaneously oscillated about their suspending shafts 123 in the same direction. The shifting of link 305 is controlled through follower 307 by a rotatable cam 306 operated from control shaft 514 of the timing mechanisms presently to be described. As shown in Figures 1, 2 and 3 with the mechanism at rest, follower 307 bears upon the upper edge of a cam shield 308, of a radius intermediate that of the bottom of a cam slot 309 and that of the general circular periphery 310 of the cam which occupies all of its extent except that occupied by the slot 309 and slot shield 308. The result is, if cam 306 be shifted rearwardly, that is to say to the left in Figure 1 or in Figure 12 which shows this cam in diagram, cam shield 308 moving to the left will permit cam follower 307 to enter cam slot 309 and thereby permit link 305 to be moved to the left as viewed in Figure 3 and so oscillate the spreaders 301 to the left of the vertical plane of the wrapping gear axes as shown diagrammatically in the small view of Figure 13A appended to Figure 13. When the spreaders occupy this position, free-end strands 72 whether laid by hand or laid by the baler, will assuredly be laid to the right of the spreaders. If, however, cam 306 is rotated by shaft 514 in the direction of the arrow (as it is ultimately rotated by the timing mechanism) follower 307 will ride out of the cam slot 309 and up onto the extensive circular periphery 310, thereby oscillating spreaders 301 in the opposite direction and to the right of the vertical plane of the axes as illustrated in the diminutive Figure 14A appended to Figure 14, thereby slightly displacing temporarily the first laid strands 72 and making way for the shuttles 261 to pass them on the left to engage and lay on the left the second free-end strands 73. A completed rotation of cam 306 carries terminal extremity of the high circular periphery 310 beyond the follower 307, once more bringing the now spread central portions 75 of the strands to positions symmetrically on opposite sides of this plane (see Figures 3 and 5). A spiral spring 311 anchored at one end to a bracket 312 extending from forward plate 80 and at the other end to the link 305 serves to keep the follower 307 in contact with the periphery of the cam.

Here perhaps is the best point to note that the plane form arrangement of the first and second free end strand lays 72, 73; and of the ring gears 101, 102 and the driving gears, of the shuttle 261 and of the spreaders 301; is the same for each of the two sides of the mechanism at large.

The bale case clamp mechanisms 340 comprise a pair of forward bale case clamps 341 and a pair of rearward bale case clamps 342. Their function is the clamping and anchoring of the bale or root ends of the free-end strands 72 and 73 after the lays are made in the wrapping mechanism 100 but before wrapping action ensues in order to prevent tensions in the body 65 of the loop about the bale and the bale strands 69 across the rear of the bale from interfering with the freedom of manipulation of the free end strands by the wrapping mechanism 100 to form the barrel knot. These clamps 341, 342 may be of any of the known forms, but in the form illustrated all of them comprise fixed jaws 343 attached rigidly to the mounting base of the mechanism (either base plate or bale case), and relatively movable jaws 344. These jaws are provided with mating offsets or corrugations 345 the better to enable them to firmly grip the body of the strand passed between them. The fixed jaws are arranged near the outer edges of the bale case slots 56 while the movable jaws 344 are located near the inner edges of these slots 56. The movable jaws 344, as clearly appears in Figure 3, are suspended for oscillation toward and from the upper bifurcated ends of bearing brackets previously identified with the main frame of the mechanism. Like means for simultaneously opening and closing the clamps 341 and 342 in pairs are provided both forwardly of the wrapping mechanism 100 and rearwardly thereof and in the transverse planes of the respective pairs of clamps. This means comprises in each case a pair of operating links 349 having pivotal connection at their lower ends with the movable jaws 344 below their pintle mountings 348 and pivotal connection with each other and with a centrally located operating plunger 350 at their upper ends. Depression of plunger 350 closes the jaws of the clamps, while its raising opens them. Plunger 350 is slidably borne in a hollow pedestal 89 welded to the base 78 and pressed upwardly to normally hold the bale case clamps open by a compression spring 351 bearing against a collar 352 fixed to the body of the plunger adjustably, as by the set screw shown. It is operated downwardly against the pressure of spring 351 to close the bale case clamps through the engagement of a follower 353 with the periphery 354 of a power operated cam. That cam which operates the forward clamps 341 is numbered 355 in the diagram of Figure 12 while that which operates the rearward clamps 342 is numbered 356, for these cams are of different form and of different timing. In each case, as clearly appears in Figure 12, when the mechanism is at rest, the followers 353 ride on cam shields 357 which are of the maximum radius of the cam, a radius adequate to press the movable jaws firmly home upon the body of the strand and firmly hold it in grip against the tensions set up in the body of the bale loop 65 respectively by the baling and the needle loop forming operations. Opposite each shield 357 the cam periphery drops away in the form of a peripheral slot 358 in the case of the clamp 355, the forward cam, and in the form of a circular peripheral extent of reduced diameter 359 in the case of the rearward cam 356. Thus in each case upon a shift of the cams to the left as indicated by the arrows in Figure 12, the followers 353 slip from the periphery of the shields 357, the one into the slot 358 and the other to the reduced diameter circular periphery 359. Both followers then move upwardly to the same extent, an extent sufficient to enable spring 351 to open wide the jaws of the clamps to receive the strands of the next succeeding tie. Promptly upon rotation in the direction of the applied arrows, however, cam 355 again pushes its follower 353 downwardly and holds it down throughout an entire revolution, whereas cam 356 rests its follower 353 against its reduced periphery 359 throughout all but the latter portion of a complete revolution, but in this latter portion the projecting terminal portion 360 of the cam periphery rides follower 353 downwardly to carry it once again upon cam shield 357, the cams, of course, normally rotating their cam shields in the planes of the followers 353. This difference in the timing and sequence of the bale case clamps 341, 342 is incident to the fact that the lay of the first free-end strand 72 is already complete at the time the cycle of operation commences and therefore, the forward end of this first lay 72 is at the inception of the operation ready to have its root clamped in position, while the lay of the second strand 73 is completed only after shuttle 261 has completed its stroke and it is only then ready for its root to be clamped in position. Hence the travel of follower 353 of the rearward pair of clamps 342 upon the circular periphery 359 until after the second lay has been completed.

The coacting knot supporting underrest devices 370 engage the mid-portion 75 of the free-end strands from underneath and close to the body of the spreaders 301. The central elements of these devices (see Figure 4) are a pair of oscillable levers 371 independently mounted for oscillation on a common pintle axis 372 carried at the upper end of the supporting pedestal 90 rising from base 78 substantially in the plane of the spreaders 301, the levers lying respectively on the opposite sides of the upper end of the pedestal 90. The main bodies of the levers 371 operate in planes close to the sides of the spreaders. Extensions 373 (Fig. 5) electrically welded or otherwise secured to the main bodies 371 extend longitudinally oppositely and then laterally outwardly parallel to the main bodies 371 and to lie also in planes close to the opposite sides of the spreaders 301. They are of the same shape at the same horizontal level as the ends of the main bodies 371 to which they are attached. They are similarly upwardly curved, tapered and rounded and likewise provided with rounded and smoothed edges to avoid injury to the twine. When oscillated upwardly and outwardly they are raised into contact with the mid portions 75 of the strands as clearly shown in Figures 1, 5 and 9. The means for raising them comprises a pair of timed cams 374 power operated from on the same axis 514 as are cams 306, 355 and 356. Cams 374 lie one on either side of the centrally located spreader cam 306. They are similarly shaped but one leads the other slightly in angular position on the operating axis by reason of the fact that they respectively bear one upon follower 375 connected with one of the independently operable levers 371, and the second with the follower 375 of the other of said levers, the followers being mounted respectively on oppositely extending upper ends 376 and therefore spaced apart transversely of the mechanism. A spiral spring 377 connecting the bodies of levers 371 below the pintle 372 and extended through an aperture (not shown) in the pedestal 90 draws them toward the retracted position shown in dotted lines in Figure 4, and followers 375 bear upon the extended portions 378 of the cams 374 of reduced radius. As shown in full lines however, with the mechanism ready to commence the wrapping of the knot the followers 375 are simultaneously engaged by the rise 380 to cam shields 379 and moved to place underrests 371 in supporting engagement with the strands. So before axial movement of the cams to the left will move shields 379 from the followers and permit them to drop to the reduced peripheries 378 where they will remain until another complete revolution of cams 374 has all but been made when rise 380 will once more abruptly raise them to shields 379 and again position the rests 371 beneath the central portions 75 of the strands as spread by the members 301.

The mechanism for inserting the terminal ends of strands 72 and 73 into the space between the mid-portions 75 by the spreader 301, is designated generally 400. The central elements of the mechanism comprise pairs of inserter fingers per se 401 arcuate in form about fixed axes 402 respectively constituted by oscillable transverse shafts 403 journalled in short bearing brackets 85 and 86 located respectively just outside of the main frame plates 80 which mount and journal the wrapping gears 101, 102, and close to the main bodies of these plates 80. The radius of the arc on which inserters 401 is formed and the location of axes 402 is such that the inserters 401 will enter the space between the strands by way of the wide slots 304 in the spreaders 301 (see particularly Figures 3, 9 and 10). They enter from above the plane of the mid-portions 75 and the wraps 76 and pass through the slot and downwardly behind the underrests 371 without fouling same to a point until they carry the terminal ends 74 through the spread strands 75. Ends 74 may be carried either part way in which case they form bows, or all the way in which case their extremities are carried through as well as their main bodies. The respective forward and rearward spreader members per se 401 operate in adjoining and parallel planes, one on each side of the vertical plane of the axis, as can be clearly discerned from an inspection of the plane view of Figure 2. In conjunction with the large showings in Figures 3 and 10. Their main bodies are each substantially one-half the width of the slot 304 in the spreader 301 but, of course, less by substantial tolerances to permit their free passage therethrough alongside each other. The rearward spreaders 401 operate one of them to the inside of the axial vertical plane while the other operates on the outside. The forward spreaders are reversely arranged. This is in accord with the identity of plan form arrangement of the two knotting mechanisms on opposite sides of the machine heretofore mentioned.

In order to so position the inserter fingers 401, the forward fingers to cross the rearward fingers within the slots 304 without interference, and to avoid interferences of the spreaders with the lay of the strands 72, 73 and with the main bodies of those strands as they entered into the wrapping mechanism 100 from the bale case clamps 341 and 342, shafts 403 are terminated inwardly of the plane of the lays and connect with the fingers 401 by angular supporting arms 404, 406. These arms (see especially Figure 5) extend first radially then transversely outwardly in portions 406, then laterally in offsets 405 to knuckles 430 of fingers 401.

The point of each inserter 401 as appears the more fully in the enlarged views of Figures 5 and 10 is provided at the point and for a distance back of the point on each side with a twine engaging and holding groove 410 formed on a radius equal substantially to the radius of maximum diameter of twine to be used, and at the extremities of a depth substantially that of the radius of the groove, i. e. substantially one-half the diameter of the twine. On their adjacent sides, each insertion of the coacting pairs of inserters 401 is provided with a relatively thin forward extension 411 of its groove side wall, an extension preferably formed integrally with the main body 401. The function of these extensions is to make sure of the seating of the terminal ends 74 of the strands in the grooves 410 of the inserters when the time arrives for the insertion of terminal ends 74 between the central portions 75 of the bodies of the strands. The inserters 401 are driven through a common drive of their axis shafts 403, as shown in Figures 1 to 16. Shafts 403 are commonly operable through a link 415 which interconnects a pair of shaft operating cranks 416 which project from opposite sides of the shafts 402 respectively whereby movement of link 415 oscillates them in opposite directions to move the inserters 401 toward each during the insertion and away from each during their withdrawal. A push rod 417 slidably mounted in the base founded pedestal 84 connects with the rearward crank 416 and bears at its rearward end the follower 418 operated upon by a cam 419 rotated from an axis 420 associated with power driven shaft 571 driven from the secondary timing mechanism presently to be described. Needless to say, this cam 419 is so related to this secondary timing mechanism, and the secondary mechanism to the primary mechanism, as to effect the inserting engagement of the terminal ends 74 by the inserters 401 and their insertion only after the wraps 76 of the knot have been completed.

The insertion of the terminal ends of the mechanism 400 just described marks the completion of the knot and the completed knot is to be discharged to the bale side. If desired the lowermost extreme downward movement of inserters 401 may be made such that the offset 405 and knuckles 430 push down upon the top of the knot and start it slipping off of spreader 301. The underrests 371 being withdrawn as the inserters so push down on the knot the stripping movement of the joints will be completed by reason of the existing tensions of the strands 72, 73. On the other hand the strand tensions alone may be relied upon.

The primary timing mechanism and the secondary timing mechanism through which the driving and timing of the various interacting mechanisms and devices now described are effected are designated respectively 500 and 550. They are jointly supported from the base 65 through bearing brackets 91, 92 aforementioned and operate upon a common axis defined by the transverse primary timing and driving shaft 501 upon which the telescoped tubular driving shaft 551 of the secondary timing mechanism revolves. The central element of the primary timing mechanism 500 is a one revolution and stop detent or dog clutch comprised of driving and driven members 502, 503, the former of which is constantly rotated by chain and sprocket 504 having a one to one gear ratio with the crank shaft which drives the plunger whereby it makes one revolution in the time the plunger makes one stroke. Clutch engagement and disengagement is controlled from a typical externally projecting clutch detent 505 which is normally engaged on its under side by stop 506 which in the counter-clockwise movement of the clutch indicated by the applied arrow results in declutching engagement of the detent with the driving member 502 and stopping of the rotation of the driven member 503. Stop 506 projects radially from an oscillable shaft 507 borne in bearing brackets 95 and oscillable counter-clockwise through an upstanding lever 508 connected with the opposite end of shaft 507. This lever 508 is rockable through a control mechanism presently to be described.

Driven member 503 is rigidly connected as by keying to the driving shaft 501. That shaft at one end bears crank disk 214 which operates the needle mechanism 200 through the train of connections beginning with pitman 213. At its opposite end adjoining driven clutch member 503 shaft 501 has a chain and sprocket connection 510 with a transverse shaft 511 supported at its outer end from base pedestal 82 and at its inner end from the bearing 572 bracket mounted on the rearward face of the rearward mounting plate 80 of the wrapping mechanisms 100. There shaft 511 connects with and drives through beveled gears 513 the through-running timing control shaft 514 which mounts and drives the driving and timing cams 306, 355 and 374 which have been heretofore described in connection with their operation respectively of the spreader, the bale case clamping and the strand under-rest mechanisms 300, 340 and 370. This shaft 514 is provided with appropriate bearings 520 (Figure 5) on one plate 80, 521 on the other plate 80 and a third 522 at the extreme forward end of the shaft carried by base pedestal 83. Shaft 514 is geared with driving shaft 401 on a one to one basis.

At the instant the driven member 503 and driven shaft 501 come to rest at the close of a revolution, the cams and their followers have the relationship diagrammatically shown in Figure 12. This relationship is brought about jointly by the revolution of shaft 514 and its axial movement to the right. This axial movement is brought about by an end cam 530 mounted near the rearward end of the shaft and having a rearward face operating upon a fixed follower 531 borne by a small bracket 532 affixed (see Figure 2 especially) to one side of the channel-sectioned base pedestal 81. This endwise movement brings the cam shields 308, 357 and 379 of the cams diagrammed in Figure 12 into the planes of the cam followers. The movement takes place against the pressure of a spring 535 around the forward end of shaft 514 and confined between the bale case clamp cam 355 and the juxtaposed face of bearing 522. So axially moved as to bring the cam shields into play, shaft 514 is temporarily retained in this position against the tension of spring 535 by a trigger 536 (see Figures 1, 2, 6 and 7) engaged between the extreme rearward end of the shaft and the bottom of the channel-sectioned pillar 81 under the urge of a spiral spring 537 between the trigger and the bottom of the channel. This trigger 536 is in the form of a bell crank pivoted at 538 to the pedestal 81 and provided at the extremity of its lower arm with a follower 539 engaged by a cam 540 mounted upon driven shaft 571 of the secondary timing mechanism 550 next to be described. The bottom of the channel section serves as an end stop for the shaft.

The secondary driving and timing mechanism 550 like the primary 500, also includes as its central member a one revolution and stop clutch, but it is of the friction type rather than the detent or dog type. As in the case of the copending application above referred to it comprises a driving member 552 and a driven member 553 whose inter-connection is an interfacing 554 of brake or clutch lining material. Driving member 552 is pressed constantly toward driven member 553 by a circle of compression springs 555 (two only are shown) between member 552 and a spring confining flange 556 which revolves with driving member 552. The latter of course is appropriately slidably keyed to a through-running sleeve 557 which, passing through intervened bearing 558 is in turn driven continuously by the continuously rotating driving member 502 of the primary timing mechanism 500.

Also, as in the copending case the one revolution and stop movement of this secondary clutch 552, 553 is controlled by the engagement of the stop lug 560 with the under side of a stop lug 561 projecting radially from the bearing hub 562 of the driven member 553. As shown in the plan of Figure 2, stop member 560 has just been moved out from under lug 561 and therefore, the friction of disk 554 is about to start the driven member 553 on its revolution. This movement of stop 560 is an oscillatory movement counter-clockwise brought about by the rocking of mounting shaft 563 on which the stop is carried (see Figure 1-A especially) which has been caused by the engagement of a follower 564 on the upper end of lever 565 carried by shaft 563 by the abrupt lug 566 of a timing cam 567 (see again Figure 2) formed on the inside of the crank disk 214. The extreme of this rocking movement shown in Figure 1A occurs immediately before clutch 502, 503 become completely disengaged. As it does become disengaged and driving shaft 501 and cams 567 come fully to rest, cam lug 566 passes just below follower 564 and spring 568 returns follower 564 to the periphery of cam 567 just above the lug and so replaces stop 560 once more in the path of lug 561, which during this brief interval has already started upon its counter-clockwise revolution.

Driven member 553 of this secondary one revolution and stop clutch through bevel gears 570 connects with a centrally disposed longitudinally extending drive shaft extension 571 journaled in the bearing 572 and retained in position through a bearing extension 573 to driving shaft 501 of the primary timing mechanism. Shaft 571 has a further journaling 574 in the pedestal 81 through the bottom of the channel section of which it is extended. Between the channel bottom and the bearing 572 there emanates a one to five chain and sprocket train of step-up gearing 575, 576 to longitudinally extending centrally located wrapping gear drive shaft 577 which constitutes the axis 120 from which the main gears 121 of the gear trains of wrapping mechanism 100 are driven, as shown in Figures 3 and 6. This shaft 577 is journaled jointly in bearings 578 at the upper end of pedestal 81 and 579 at the upper ends of bearing plates 80 through which the shaft passes. This shaft 577 and each of gears 101 and 102 make five revolutions for the one of shaft 571. The ratio of course may be changed if more or less revolutions are desired.

The forward extension of drive shaft 571 through the bottom (or rear wall) of pedestal 81 connects through beveled gears 580 with the cross shaft 420 which bears and revolves operating cam 419 of the inserter mechanisms 400 (see Figures 1, 2 and 7). This shaft 420 is journaled at its opposite ends from the opposite sides of the pedestal 81. Between the bevel gear 580 borne by shaft 571 and the juxtaposed inner face of pedestal 81, shaft 571 carries cam 540 which operates trigger 536, the trigger action of which is therefore controlled and timed from the secondary timing mechanism along with the driving of the wrapping mechanism 100 and the operation of the inserter mechanisms 400.

The institution of the timing cycles carried out by the primary and secondary timing mechanisms 500 and 550, is under the control of a bale length metering device 700 in co-ordination with a plunger latch mechanism 750 (see Figures 1 and 2 and the diagram of Figure 13). These are of the general form and construction disclosed in the aforementioned co-pending application and so but a general running description will suffice as in the case of the primary and secondary driving and timing clutches. The metering mechanism 700 comprises the usual metering wheel mounted on top of the bale case and having teeth engaging the bale (shown diagrammatically in Figure 13), and the push bar 702 having a shouldered forward end which is engaged by the crank 703 of the metering wheel 701 and a down-turned extension 704 at its rearward end pivotally connected with the top of the lever 508 for the control of stop 506 governing primary clutch 502, 503. When the metering wheel completes a revolution the bale has been completed and is ready to be tied. It is at this time that crank 703 pushes on bar 702 to remove stop 506 and release detent 505 to institute the timing cycle of mechanism 500. This starts needle mechanism 200 on its way through the oscillation of the auxiliary needle operating shaft 209. (See Figures 1, 2, and 2A.) Oscillation of 209 through arm 710 carried by it and projecting beneath the body of push bar 702 raises the body of the bar and so raises it rearward and above the crank 703, permitting bar 702 to be retracted by spring 711 and so immediately restoring stop 506 to the path of the now moving detent 505 of the moving clutch, thus to halt driven member 503 and all parts connected with it at the close of its revolution.

The coordinated latch mechanism 750 also shown and described in the referred to copending application comprises the plunger latch per se 751 pivotally borne in bracket 96 and engaging the rear end of the plunger 55 at its extreme of forward movement. The plunger latch 751 is normally held out of engagement with its engaging end above the bale case by reason of the resting of cam follower 752 which operates latch control lever 753, in cam slot 754 of cam 755 driven from primary driving shaft 501 as will readily be seen from plan of Figure 2. Cam 755 is formed upon the periphery of crank disk 214 as shown in the diagram of Figure 13 which depicts the inception of the operation of the primary timing mechanism 500 and the initial movement of the needle mechanism 200 and shuttle mechanism 260. Follower 752 has just moved out of its normal resting place 754 to drop the latch 751 behind plunger 55, the plunger having just the moment before reached its extreme forward movement, and the moment after become uncoupled from its driving crank by reason of the engagement of the latch. It is this latching in place of the plunger 55 which enables the primary timing mechanism 500 to carry out its needle and shuttle driving and knot tying control operations without interference from plunger operations. It is the reentry of follower 752 in notch 754 at the close of the driving and control operations of primary driving timing mechanism 500 which raised the latch 751 and permits the plunger to enter upon a fresh stroke during the time the secondary timing mechanism 550 drives the wrapping mechanisms 100 and achieves the knot for which the strands have been prepared by the immediately preceding driving and control operations of the primary timing mechanism 500.

*Operation*

With this understanding of the various inter-acting devices and ancillary mechanisms making up the barrel knot tying mechanism at large, its operation can very readily be followed by reference to those various views and the diagrams in which the twine to be tied appears in the various stages of its manipulations by the mechanism. Inasmuch as the stage of manipulation represented in the principal figures of the drawings, Figures 1 to 8 is that just following the completion of the lays of the free end strands in the established positions for the formation of the knot and just preceding the commencement of the knot by the starting of the wrapping of the strands about each other to form the barrel of the knot tracing through of a complete cycle of operation is best commenced by reference to the diagram of Figure 13 which depicts the relation of the parts at the beginning of the cycle. Here an advanced bale is illustrated as just having been completed and the metering wheel 701 as having but just instituted the one revolution cycle of the primary timing mechanism 500. The needles 201 have just entered the bale case and have commenced their passage through the body of the plunger (the usual slots being provided) and the shuttles 261 have just commenced their downward and rearward movement. The free end strand 72 has previously been laid in its knot forming position by the bale itself in its process of formation. In making this first lay the forward end of the bale as its first wad was advanced by the plunger 55 engaged spool strand 70 held in the grip of metering arm clamp 242 and began the loop of 65 about the bale. This loop was progressively extended as the bale advanced in length, wad by wad until, as shown in Figure 13 it encompassed the entire bale. Under the drag of this loop 65 on the free end strand 72, the strand was stretched taut under heavy tension from metering arm clamp 242, through the then open forward bale case clamp 341 and entered into the yieldably engaging wrapping clamp 103 of the rearward gear 101 where its body is yieldably held in groove 115 through the action of clamp spring 113. The extremity of the strand throughout the formation of the bale remained in the grip of the metering clamp 242 as it appears in Figure 13, but at the illustrated inception of the cycle of the primary timing mechanism 500 it is about to be released in order that the metering mechanism 230 can move clamp 242 and the associated hook 237 downwardly to meet the soon-to-arrive new needle loop.

The same initial movement of the primary timing mechanism 500 which starts needles 201 and the shuttles 261 forward, at its very inception operates the spreader mechanisms 300 to shift spreaders 301 from the position shown in Figures 13A to the positions shown in Figure 14A to make way for the passage of the shuttles through the gears 101, 102 without fouling and to enable them to make a rectilinear lay of the second free end strand 73. Simultaneously also this initial movement closes the forward bale case clamps 341 to anchor the lower ends of the bale strands 72 at the bale case against the tension in the bale loops 65 and so prevents its subsequent interference with the further manipulation of the strands 72 in the tying of the knots. These simultaneous operations of spreader mechanisms 300 and free end clamps 341 are brought about by the initial movements of cams 306 and 355 from their rest positions, the angularity of which in respect to the vertical plane illustrated in Figure 12 (the followers 307 and 351 at this time, of course, contacting the peripheries of the cams proper rather than the cam shields). It is immediately following the closing of the forward bale case clamp 341 that the strand terminal clamp 242 carried by metering arm 231 is released. This is achieved by shaping the cam 233 to institute the downward movement of arm 231 upon which clamp 242 is mounted immediately following the movement of cam 355 to close the clamps 341. It will be noted particularly by referring to Figure 1 that cam 233 is required to move a few degrees under the drive of primary shaft 501 before it permits spring 250 to press follower 235 downwardly and so drop operating arm 244 of metering clamp 242 upon releasing lug 247 to free the terminal 74 of strand 72.

These operations follow in rapid succession and the needles 201, shuttles 261 and metering arms 231 are quickly projected to the region of their intimate coaction, the region of the needle loop 68 as projected to its upward extreme as shown in Figure 14. When in intimate coaction it is the metering arm 231 which first reaches the needle loop 1 and, its hook 237 engages with the bight 71 of the presented loop. The timing is such as to have this take place just before the bay 223 is presented for the entry of hook 277 by the point of the shuttle 261. Metering arm 231 commences its drive as bight 71 takes the last few degrees of upward movement and dwells momentarily (by reason of the mutilation of gear 210 and rack 211) and as the needle 201 opens its retracting stroke cam 233 carries the bight of the loop rapidly upward. It is in this period of the last few degrees of movement upward the momentary dwell, and the first few degrees of downward retraction that the shuttle 261 projects its hook 277 into and out of the bay 223 to engage and withdraw the bale strand 69 of the needle loop which is to become the second free end strand 73. These timings will become clear upon observing the shape of the cam 233 and the position of the crank 270 which respectively operate the metering arm 231 and the shuttle 261. Cam 233 moves abruptly outwardly toward its maximum radius while crank 270 is at such an angle that it somewhat speeds up the movement of shuttle 261 in spite of the fact that crank disk 214 is in the vicinity of its 180 degree position and both the needle and shuttle-drives which derive from it are slowed up, for rack 273 and gear 272 are not mutilated. The important thing is that hook 277 of the shuttle enters and leaves bay 223 with strand 69 before the forwardly overhanging point 220 can strike it as it progresses upon its downward movement.

The result of the abrupt radial drift of cam 233 is that metering arm 231 before the needles have been more than half way retracted, is carried to its extreme upper position as shown in Figure 15, and before the shuttle 261 has carried the new strand 73 more than a little way toward the wrapping mechanism 100 which is to receive it. It is at the juncture represented in Figure 16 that operating lever 244 of needle clamp 242 engages the upper lug 245 and the clamp is closed and firmly tightened about the terminus of the free end strand 72 which is to constitute the first lay of the tie of the next succeeding bale. This clamping action takes place within but a few degrees of the uppermost extreme movement of the arm 231. During those few degrees and before the uppermost limit illustrated in Figure 15 is reached, the cutting blade 250 enters the slot 252 (see Figures 1 and 15) in the twine disk of hook 237 and severs the instant second strand 73 from the clamped terminus of strand 72. The cutting accompanies the clamping the two actions taking place substantially simultaneously, but the clamping may start slightly in advance of the cutting.

A slight dwell of the parts in this relationship is indicated in Figure 15, but almost immediately afterward metering arm 231 drops to the intermediate position shown in Figure 16 and in Figure 1 a position somewhat above the taut line of the laid strand 72. The shuttle 261 meanwhile, draws the free end strand 73 through the wrapping mechanism 100, drawing it taut as it drags frictionally through the hook 277 and effecting the second lay by pressing the taut strand 73 between the jaws of yieldably engaging wrapping clamp 104 carried by the forward gear 102. There it rests momentarily as the shuttle 261 covers the last few degrees between its end position and its extreme upward position, the needle 201 in the meantime nearing its extreme retracted position.

Passage through these last few degrees of its revolution has caused the primary timing mechanism 500 to drive the primary cam control shaft 514 to effect almost simultaneously if not simultaneously: first, the operation of cam 356 to close the rearward bale case clamp 342 about the root (the bale loop end) of the newly laid strand 73; second; through operation of cam 306 the dropping of follower 307 onto the periphery 308 of the cam shield of reduced radius, so bringing the spreaders 301 to their central positions as illustrated in Figures 3 and 4; and third; through cams 374 the raising of the underrests 371 to the strand supporting position shown in Figures 1, 4, 5 and 9. In all three cases the cam followers were brought to bear upon the associated cam shields as they appear in Figure 12 for the reason that while shuttles 261 were on their way to the needle loop and back again, cam 530 on the rearward end of shaft 514 (see Figures 1, 2 and 12) was engaged by the fixed follower 531 and shaft 514 shifted forwardly sufficiently for trigger 536 to slip between its rearward end and the adjoining face of pedestal 81, so latching it in axially displaced position and placing all the cam shields in the transaxial planes of their followers. There they remain until trigger 536 is released. When shaft 514 and its control cams come to rest in the position shown in Figure 12 cam 530 presents cam slot 533 opposite follower 531 ready again to receive the follower when shaft 514 is released to its normal position to free the followers of the cam shields.

It is also in the last few degrees of the cycle revolution of primary timing mechanism 500 that cam lug 561 (see Figures 1 and 1A) rocks the stop 560 from under retaining lug 561 of the driven member 553 of the secondary timing mechanism 550 and its clutch 552, 553 commences its one revolution and stop cycle. At its very inception it commences to drive the wrapping mechanisms 100 to achieve the wraps. The hollow gears 101, 102 and the yieldably engaging free end clamps 103, 104 are rapidly rotated in opposite directions, the directions shown by arrows, to achieve the number of wraps desired, in this case four wraps, the number for which the gear ratios have been chosen. The ratios may be chosen for other numbers of wraps if desired. The wrapping directions are preferably, though not necessarily, in the same direction as the twist in the twine as viewed from the center of the knot, looking toward its respective ends and hence in opposite directions: right handedly in the case for right hand twist twine. It is this that makes desirable the identity of the plan form arrangement of the right and left tie mechanisms above described. These four revolutions chosen take place in but 288 degrees of the revolution of the secondary control mechanism 550 and its drive shaft 571, for the step up gear train 575, 576 for drive shaft 577 of the wrapping mechanisms 100 has a one to five ratio.

All during the operation of primary timing device 500 and during the first three revolutions of gears 101, 102 and the first three fourths of the fourth revolution, the inserters 401 remain in the idle position shown in Figures 1 to 8. During the last quarter of the fourth revolution and the fourth wraps however, and before the fourth wrap is completed the inserters are moved toward each other sufficiently to place their end extension 411 in the path of revolution of the terminals 74 of the strands 72, 73. This is because the toothed segment of gears 581, being 90° in extent engages idler 582 18° before the fourth revolution is completed. Through such positioning of the inserters, as the fourth revolution is completed and terminals 74 are advanced a few degrees toward an ensuing fifth revolution, terminals 74 are caught by extensions 411 and to be seated in the terminal grooves 410 of the projecting points of the inserters 401, as the inserters continue their advance.

To recapitulate in other words such initial movement of extensions 411 is brought about by the engagement of cam 419 with follower 418 of the inserter mechanism (see Figure 1) and it is timed to take place preferably during the last quarter of the fourth revolution, which is to say, when the revolution of shaft 571 and cam shaft 420 have covered about 270 degrees and are within 18 degrees of the 288 degree point at which the fourth revolution of gears 101, 102 is completed. Cam 419 rises in radius rapidly from such a point onward so propelling the inserter fingers 401 and the strand terminals 74 now seated in end grooves 410 toward and into the slots 304 of the spreaders 301 and on down on through the several positions shown in Figures 9 in dotted lines, to carry the terminals 74 of the strands all the way through spread mid-portions 75 and so complete the knot. In so doing, in their movements past their full line positions shown in Figure 9 they drag the yieldably engaged terminal extremities free of the clamps 103, 104 of the wrapping mechanisms 100, looping them side by side into slot 304 and between strands 75, and sliding the bights of the loops so formed frictionally through grooves 410, first to draw terminals 74 tightly over the wraps and between the strands, and finally if desired, to free their ends. Either by metering strands 72, 73 extra long or by shortening the inserter strokes, the terminal may be allowed to remain in the knot in bowed form, as in a bow knot. Thereupon the inserters are abruptly withdrawn through the abrupt radial descent of cam 419 toward its center, withdrawn all the wall to the positions of rest in which they appear in Figures 1 and 8. Before reaching their lowermost extreme of inserting movement however, the offsets 405 and the knuckles 430 will have engaged the knot if so arranged and started it downwardly to free it from the spreads 301 and enable it to be stripped to the side of the bale.

This stripping action is free to take place at this time for the reason that just as cam follower 418 reaches the peak of cam 419, cam 540 (see Figures 6 and 7 also Figures 1 and 2) engages and operates trigger 536 through follower 539 to move trigger 536 counter-clockwise so releasing primary control shaft 514 for an abrupt rearward movement under the urge of spring 535. The timing of cam 540 is adjusted so that this axial release of primary control shaft 514 takes place concurrently with such stripping action of the inserters 401 as is used. The underrests 371 in such case recede downwardly abruptly just as the inserters approach their extreme downward movement.

Simultaneously with the drop of the underrest followers 375 to the peripheries of their cams 374, followers 351 of the bale case clamp are dropped to the peripheries of cams 355 and 356 and the bale case clamps 341 and 342 are released. This frees the tension in loop 65 to pull the completed knot from the spreader 301. Likewise follower 307 which operates the spreaders 301 is rendered free to drop to its inner most position defined by cam slot 309 under the urge of retracting spring 311. Therefore so soon as the inserters leave slot 304 the spreaders, now freed of the completed knot, once more move to the positions shown in Figures 13A to make ready for the next succeeding free end strand 72 as the plunger in its resumed operations takes its first few strokes toward the formation of the next bale.

This control functioning of the secondary timing mechanism 550 completed, and the inserters being returned to their normal positions, the revolution of the secondary clutch 552, 553 ceases, for at this juncture, just as the wrapping gears 101, 102 complete their fifth revolution, stop 560 is reengaged by lug 561 and the mechanism is brought to rest with all the parts ready to undertake the next succeeding tying cycle.

The modification of Figures 17 to 24 differs from the principal embodiment not in general arrangement or primary functionings of the several mechanisms and devices which comprise the entirety, but in the structural embodiment and arrangement of certain of them. Accordingly all parts whose individual construction is the same as in the principal embodiment will be designated by corresponding reference numerals irrespective of arrangement, and when the arrangement differs, the difference will be pointed out, while the new constructions will be accorded new numerals. It may be assumed therefore that unless the contrary is stated or supplementation is made, that construction, arrangement and functioning of the parts bearing the original reference numerals are each of them the same as those outlined in connection with the principal embodiment.

In connection with Figure 17 therefore it needs but to be pointed out that the gear clamps 103, 104 which yieldably engage the strands 72 and 73 are mounted upon the outer faces of the respective gears 101, 102 of the wrapping mechanism 100, in lieu of the inner faces thereof. Through this is derived the advantage that the lays of the strands can be made with less danger of interference from either the frame members 80 or the inner peripheries either of the journals 107 or the gears 101, 102. Moreover if desired, the diameter of the gears and their journals and the angles of the X-form lay can be decreased with resultant greater compactness and more ready stripping, and the completion of the tie about the bale with less slack incident to the height at which the knot is made. Still further if desired, metering arms 231 and end clamp 242 which it bears and the shuttle 261 and the hoop 277 can the more readily take higher rest levels and so the more strongly press the strands 72, 73 into the gear clamps 103, 104, even taking the terminal ends 74 above the rectilinear reach of the main bodies of the strands from the bale case clamps 341, 342 at their roots to the wrapping clamps 103, 104.

Figure 17 also embodies two special knot-stripping mechanisms 800 which operate independently of the inserter mechanisms 400 and irrespective of whether elbows 430 or offsets 405 of the inserters 401 are utilized to aid in the stripping. (As indicated hereinabove they may or may not be so utilized.) Nor need they be dependent upon aid from the tension in strands 72, 73 effective upon the release of the bale case clamps 341, 342. Inasmuch as these stripping mechanisms 800, arranged one in front and one to the rear of mounting plate 80, are identical in construction and they engage strands 72, 73 symmetrically with respect to the plane of symmetry of the tier mechanism per se, only one of them needs be described. A pair of right and left stripper arms 801 flanking a tubular pedestal 802, one on either side thereof, have pivotal connection at 803 with ears 804 projecting transversely from opposite sides of pedestal 802 viewed in elevation. They cross each other as shown at an acute angle and have pin and slot connections 805 commonly with the reciprocable plunger 806 slidably mounted and guided within the hollow of pedestal 802. Slots 807 in opposite sides of the pedestal 802 permit movement of the pin of the connection 805 up and down with the plunger movement. Normally the pin lies in the upper end of slot 807 by reason of the upward bias of the plunger 806 under the urge of compression spring 808 confined between the lower end of the plunger and the base 78 upon which the pedestal is erected. However the plunger 806 has a rod connection 809 with a follower 810 operated upon by a cam 811 borne by the timing control shaft 514 which bears and operates the several cams of the tying mechanism per se described in connection with the principal embodiment.

The upper extremities 815 of the levers 801 are outturned tapered and well rounded. Including their tips 815, levers 801 are of a length sufficient to reach from their pivots 803 well past the plane of the main bodies of strands 72 and 73 when plunger 806 is depressed by cam 811, whereby ends 815 press down upon the strands and so will draw the completed knots from their encompassing engagement with spreaders 301. Cam 811 is provided with a very prominent and abrupt actuating lug 812 designed to strike the stripping levers 801 abruptly down and up again to quickly achieve the stripping. In their positions of rest they lie entirely inside of the planes occupied by the respective strands 72, 73 and the paths of movement of spreaders, shuttles, and other parts.

The construction and arrangement of the inserters per se remains the same in this modification but the driving mechanism is changed. Instead of driving from a common cam 419 through a common linkage, each inserter mechanism 400 is provided with an individual drive, not directly from the secondary timing mechanism but from the primary control shaft 514. While omitted from Figure 17 for the sake of clarity this drive is fully shown in Figure 18 in connection with the rearward mechanism 400, but it is to be understood that it is to be duplicated in connection with the forward mechanism. The drive is from a slotted cam 450 directly mounted upon and driven from control shaft 514. For the shape of the cam see Figure 21. This cam 450 operates through a follower 451 at the top of a rod 452 which emanates from a plunger 453 slidably guided in the hollow of a pedestal 454 founded on base 78 (or the top of the bale case as heretofore pointed out) and having a pin and slot connection 455 (operating through side slot 456 in the pedestal) with the link 457 connecting directly with the crank 416 on the transverse shaft 403 which operates the inserters 401 of the two tier units of the mechanism. As clearly appears in Figure 21 the cam slot 460 is arcuate and of uniform radius through substantially 180 degrees, whereby the inserters 401 may dwell in their rest positions as shown for 180 degree movement of control shaft 514. However, the slot is so shaped for the remaining 180 degrees of its ambit as first to carry follower 451 part way up to point 461 then to cause it to dwell there for a slight interval, then to follow the dwell with a relatively abrupt movement to an uppermost position 462 approximately 90 degrees from the arcuate portion of the slot, and during the next and final 90 degrees of its movement to abruptly return the follower 451 to the arcuate portion as indicated by the dotted line representation of the follower at the inception of the arcuate portion 462. Cam 450 of the rearward unit lies intermediate the larger of the gears 532 and a cam 356 of the rearward bale case clamp mechanism 340. The cam 450 for operating the forward inserter mechanism 400 will be of course symmetrically located, intermediate the stripper cam 811 of the forward stripper mechanism 800 and the forward cam 355 (see Figures 1 and 2) of the forward bale case clamp operating mechanism 340.

Referring now to Figure 18, it will be seen that the modification embodies quite different drive connections from the primary and secondary timing mechanisms 500, 550. First the beveled gears 532 through which the driving connection of the control shaft 514 is effected in the primary mechanism 500 has a different gear ratio, a two to one ratio instead of a one to one ratio whereby shaft 514 may make but half revolution while the primary timing clutch 502, 503 makes but one revolution (refer momentarily to Figure 2). That one of the gears 532 which is mounted on shaft 513 is mounted to revolve freely thereon at its hub. Its driving connection with shaft 514 is constituted by a pair of driving pawls 541, 542 arranged at 180 degrees from each other and coacting commonly but at different times with a single driving lug 543 on the periphery of the driving disk 544 keyed at 545 to shaft 514.

The connection of the one-revolution and stop shaft 571 of the secondary timing mechanism with shaft 514 instead of being through the trigger mechanism of Figure 7 of the principal embodiment is through the mutilated gear connection of Figure 20, and a pawl connection similar to that just described. A large gear 581 keyed to shaft 571 and therefore (in this embodiment) making but one revolution to the five revolutions of the wrapping gears 101, 102 is a segmental gear which carries teeth on but 90 degrees of its periphery. It drives through an idler gear 582 carried from pedestal 81 a full toothed gear 583 which, except for the pawl connection mentioned, is free to revolve on shaft 514. The pawl connection comprises a disk 584 having a sleeve connection 585 with the gear 583 and bearing on its forward face two pawls 586, 587, 180 degrees apart and coacting commonly like the pawls 541 and 542 with a single lug 588 on a disc 589 keyed to shaft 514. The arrangement is such that lugs 543 and 588 have the same angular relation with respect to shaft 514, being longitudinally in alignment with each other. Furthermore, the ratio of gears 581, 583 is a one-to-two basis whereby the 90 degree segment of teeth on 581 is sufficient to drive gear 583 180 degrees. (Note that the precise diameters of pitch circles and the precise numbers of teeth are not shown on any of the gears. They are rough approximations only.) Through locking segment 590 carried by idler 582 gear 583 becomes locked to the locking periphery 591 of gear 581 after each such 180 degree movement. Accordingly gears 532 and 581, 583 being set while the mechanisms 550 and 500 are at rest to have their pawls 541, or 586 as the case may be (or alternatively 542 or 587) bear drivingly against the aligned lugs 543 and 588 respectively, first gears 532 will drive shafts 514 through 180 degrees in the one revolution of clutch 502, 503 and then the secondary timing mechanism taking over, shaft 571 after 270 degrees of its movement will drive shaft 514 through its next 180 degrees during the remaining 90 degrees of movement of 571. This remaining 90 degrees of movement of shaft 571 is that in which the fourth revolution of the wrapping gears 101, 102 is being completed and their fifth revolution takes place.

Operation of the modification

The operation of this modification differs from the operation of the principal form mainly in the fact that the operations of inserting the terminals of the strand and the stripping of the completed knot, are achieved through rotation of control shaft 514 from the secondary timing mechanism 550 through its drive shaft 571 in lieu of direct operation from the shaft; and in the fact that restoration of the several ancillary mechanisms and devices to normal rest position is also achieved by the rotation of the shaft 514 rather than by axial movement of that shaft. The functioning is the following. Primary timing mechanism 500 in its one revolution and stop cycle drives shaft 514 through 180 degrees from the position shown in Figure 22 to the position shown in Figure 23. This is by reason of the fact that upper pawl 541 only engages the unitary lug 543 of disk 544 and drives it from its upper position 180 degrees to its lower position, the big gear 532 revolving but 180 degrees for the complete revolution of the small gear 532 and so carrying the idle pawl 542 from its lower position to its upper position. (Pawls 542, 587 initially the lower pawls are shaded to enable one the more readily to follow through the cycle.) During this 180 degrees movement of shaft 514 the gear 538 and its associated pawl carrying disk 584 remain idle and locked in position by the interlocked segment 590 of pinion 582 and circular periphery 591 of driving gear 581.

Upon the close of the single revolution cycle of primary timing mechanism 500 however, it will be remembered that secondary timing mechanism 550 is released for its single revolution cycle. During the first 270 degrees of this single revolution as carried out by driving shaft 571 the gear 581 (see Figure 20) travels without breaking the interlocking connection 590, 591 or disturbing idler 582, gear 583 and pawl disk 584. Accordingly shaft 514 remains at rest with the pawls 541 and 587 and the lugs 543 and 588 in the relationship shown as established by its first 180 degrees movement as shown in Figure 23. In this relationship lug 588 having been moved 180 degrees from its rest position shown in Figure 22, has passed under pawl 587, and pawl 587 is engaged with its rear face and ready to drive it through another 180 degrees, so to complete a revolution of control shaft 514. The final 90 degrees of the revolution of secondary timing shaft 571 brings about this second 180 degree movement. It is the inception of this final 90 degrees of travel of gear 581 which is illustrated in Figure 20. The first few teeth of the 90 degree gear-toothed segment are shown to have engaged idler 582 and unlocked the gears. This has resulted in the driving of pawl disk 584 and shaft 514 to the dotted line position shown in Figure 23. The continued travel of gear 581 as it completes its revolution, drives pawl disk 584 and shaft 514 again to its rest position with lugs 543, 588 again in their uppermost position as shown in Figure 24, but this time with pawls 542 and 587 uppermost instead of pawls 541 and 586. Gears 581 and 582 once more lock and the parts remain at rest in this relationship until a new bale has called for the next succeeding cycle, when this time pawl 542 of the primary drive will achieve the first 180 degrees of movement of shaft 514 and pawl 586 of the secondary drive will achieve the second.

So much for the operation of the control shaft 514. The operation of the mechanisms and devices which they control is quite the same in the case of all those devices embodied without change in the principal modification, that is to say the bale case clamp mechanism 340, the spreader mechanism 300 and the under-rest device 370.

The operation of the inserter mechanism differs slightly though its general cycle of operation is the same. During the first 270 degrees movement of secondary driving shaft 571 the wrapping gears due to the one-to-five ratio between shaft 571 and gear drive shaft 577 will have driven the wrapping gears through three and three-quarters revolutions, and during the next 18 degrees of movement of 571 (to its 288 degree position) will have completed the fourth revolution (72 degrees being required to effect each revolution of the wrapping gears 101, 102). Within this 18 degrees of the action of the 90 degree toothed segment of gear 581, movement of shaft 514, which through three and three-fourths wraps of the knot has remained in the idle position diagrammed in full lines in Figure 23, is moved to the dotted line position there shown. In this movement the drop from the terminus of the arcuate dwell section of slot 460 of cam 450 to a position 461 brings about the momentary placement of the extensions 411 of the inserter points in the paths of the strand terminals 74 as they complete the last 90 degree movement or last quarter turn of the fourth wrap, so placing them under control of the inserter points as shown in Figure 20 ready for the operation of the inserters to pass them between the spread portions 75 of the strand and so complete the knot. The remaining 72 degrees of action of the toothed segment of gear 581 achieves this, the cam slot dropping abruptly radially inward to position 462 and rising as abruptly again to the arcuate reach 460 as gear 581 approaches a stop. Thus the inserters 401 are moved quickly into and out of slots 304 of the spreaders 301 and quickly complete the knot. This takes place during the fifth or idle revolution of the wrapping gears 101, 102, but before that revolution ends. While but a brief dwell on position 461 of cam 450 is indicated in Figure 21, this dwell may be lengthened or shortened as desired thereby to delay or shorten the period of insertion and withdrawal of the inserter and so affect its timing within the idle fifth revolution of the wrappng mechanism. Likewise the inception of the arcuate rest-reach 460 of the cam may be advanced thereby insuring earlier placement of the inserters 401 in their rest position, placement taking place if desired just in advance of the completion of the revolution of the secondary mechanism 550. This, by way of pointing out that variations in the shape of cam 450 and in the angular extent of the tooth-gear segment of gear 581 may be made as desired to effect preferred timings and likewise to effect preferred degrees of throw of the inserter points.

In connection with the independent stripping mechanism 800 provided in this modification, the degree of throw of the inserters needs to be mentioned. There being independent stripping means 800, aid from the inserters is of no moment. Therefore, the innermost reach 462 of the cam slot of cam 450 stops short of taking the elbows 430 and the offsets 405 of the inserters 401 into displacing contact with the wrap 76 of the completed knot.

Cams 811 of the stripper mechanism 800 (see Figures 17 and 21) are angularly so adjusted that they come into action preferably just as the inserter points 411 are leaving or about to leave the spreader slots 304, whereby to abruptly strike the strands 72, 73 and move the completed knot downwardly without interference from the inserters in their extreme downward positions. Again the timing may be varied, especially to bring the stripping arms 801 forwardly ready to strike strands 72, 73 while the inserters 401 are on their way upward, so that they strike the moment that the ends 411 are sufficiently raised to clear the terminals 74 as the knot is struck down by the impact of the arms upon strands 72, 73. Obviously also the timing of the stripper cam and the timing of the under-rest cam are related as were the timing of the inserter and the timing of the under-rest cam in the principal modification. Thus the under-rest cam needs move the under rests 371 from beneath the knot slightly before or simultaneously with the action of the stripper arm 801 in stripping the knot. That the modification affords material advantages in timing over the principal embodiment is thus clearly apparent. The relative openings and closings of operations of the several mechanisms and devices is much more readily adjusted, likewise the length of time available for each of the operations is a more readily lengthened or shortened as particular conditions may require. Too, the smoothness of operations of cams and followers may be more fully assured because greater range of movement of the cams can be had when 180 degrees are available for operations, as against the 72 degrees maximum available in the principal embodiment.

It is incident to the latter that it becomes possible to effect all the restoring operations to prepare for the next cycle also by rotation of shaft 514, for the final few degrees of this rotation can be and are utilized in this embodiment not only to bring the inserters 401 and strippers 801 to their normal rest positions but also to bring the under rests 371, the spreaders 301 and the bale case clamps 341, 342 to their normal rest positions, positions in which the latter remain open to receive the next succeeding strands 72, 73 to be laid and in which the spreaders 301 occupy the left hand positions shown in Figure 13-A and so insure the lay of strands 72 on their right hand sides. So too it makes possible the delay of movement of spreaders 301 from their central knot forming position to the left positions until the completed knot is free of them entirely, this merely by ending the downward stripping movement of cam 811 before or just as the spreader restoring movement of spreader cam 306 begins. Rotation rather than endwise movement of shaft 514 being used for these purposes no cam shields are needed.

We claim:

1. A mechanism for knotting together the free end strands of a loop about a bale comprising a pair of strand wrapping clamps at spaced points establishing the overlapping positions of the strands for tying of the knot, spaced slotted ring gears mounting and revolving said clamps to interwrap the strands in spaced regions, strand spreading means disposed between said ring gears to maintain an unwrapped region between said spaced regions, and means movable between strand portions in said unwrapped region and engageable with the strand terminals to effect their insertion between said strand portions.

2. A mechanism according to claim 1 in which the ring gears are provided with complementally slotted ring journals and slotted bearings and all the said slots are in registry when the ring gears are at rest.

3. A mechanism according to claim 1 in which the wrapping clamps project radially inward of the inner peripheries of the ring gears and open toward the axis of rotation thereof.

4. A mechanism according to claim 1 in which the wrapping clamps are mounted diametrically opposite the slots in the gears and open toward them.

5. A mechanism according to claim 1 in which the wrapping clamps are carried by the gears on relatively adjacent faces thereof and engage the strands at points spaced inwardly of the inner peripheries of the gears.

6. A mechanism for knotting together the free end strands of a loop about a bale comprising a pair of strand wrapping clamps at spaced points establishing the overlapping positions of the strands for the tying of the knot, spaced rotatable means mounting and revolving said clamps to interwrap the strands in spaced regions leaving an unwrapped region therebetween, strand spreading means disposed between said rotatable means to prevent wrapping of the strands in said unwrapped region, means movable between strand portions in the region between the wraps and engageable with strand terminals to effect their insertion between said strand portions, and strand laying means which conveys one free end strand to one of said clamps.

7. A mechanism according to claim 6 in which the wrapping clamps comprise interleaved edgewise engaging plates in planes transverse to the axis of rotation of the gears.

8. A mechanism according to claim 6 in which the wrapping clamps comprise interleaved edgewise engaging plates having strand receiving slots in some at least of their clamping edges.

9. A mechanism according to claim 1 in which the wrapping clamps comprise members fixed immovably to the ring gears and containing strand receiving and retaining slots.

10. A mechanism according to claim 6 in which the clamps embody members fixed immovably to the rotatable clamp mounting means and from which members the strands are fed to the wraps.

11. A mechanism according to claim 6 in which the terminal inserting means comprises spaced inserter members pivotal about fixed axes outside of the ring gears.

12. A mechanism according to claim 6 in which the terminal inserting means comprises members moving between the strand portions simultaneously and side by side to insert the terminals.

13. A mechanism according to claim 6 in which the terminal inserting means comprises inserter fingers having strand inserting ends flanked on one side by elongated side wall extensions adapted to engage strand terminals in their extent from said wrapping clamps to align the strand terminals for engagement by the inserter ends.

14. A mechanism according to claim 6 in which the terminal inserting means comprises a pair of inserter members each of which operates, respectively in a plane substantially parallel to the general plane of one of the terminal strands, together with supporting and operating means for said members which is offset laterally from said plane to avoid fouling of the strands.

15. A mechanism according to claim 6 in which the terminal inserting means consists of inserter fingers having strand inserting ends and provided in regions remote from the ends with angular portions adapted through extreme movement of the fingers to initiate stripping of a completed knot from the mechanism.

16. A mechanism according to claim 1, in which one at least of the strands is laid in its established position in a wrapping clamp by shuttle means operating through the ring gears.

17. A mechanism according to claim 1, in which shuttle means operating through the ring gears is provided to make the lay of at least one of the strands in its associated wrapping clamp and in the strand overlapping position established thereby, and said shuttle means is oscillatable from an axis above the ring gears to move its strand engaging end on an arc extending through the gears from a point above their inner peripheries.

18. A mechanism according to claim 6 in which the strand laying means includes a hook, said strand laying means engaging a strand for laying it through said hook, said hook having a frictional engagement with the strand which resists the travel of the strand thereover to tension the strand.

19. A mechanism according to claim 6, in which the strand laying means includes a hook, said strand laying means engaging a strand for laying it through said hook, said hook having arms which define an opening which has a width less than the diameter of the engaged strand, whereby the travel of the strand thereover is frictionally resisted to tension the strand.

20. A mechanism according to claim 1 together with needle means presenting a needle loop for the formation of free end strands to be knotted together and shuttle means operating through the ring gears and engaging the bale strand which is to constitute one of the free end strands.

21. A mechanism according to claim 1 together with needle means presenting a needle loop for the formation of free end strands to be knotted together, free end strand metering means engaging the needle loop and extending it to achieve the length of strands desired, and shuttle means operating through the rings gears and engaging with one of said strands to effect its placement in its established overlapping position in the grip of a wrapping clamp.

22. A mechanism for knotting together the free end strands of a loop about a bale, embodying means for pre-establishing the positions of the strands for the knotting operation, a needle for projecting a strand loop around the rear end of the bale, metering means for taking said loop from the needle and drawing same to a predetermined position, means cooperating with said metering means for severing said loop to form the ends respectively of a second free end strand for the immediate bale, and a first free end strand for a succeeding bale, means for laying said severed second and first strands in succession in said means for pre-establishing the positions of the strands, and means for knotting the positioned strands.

23. A mechanism according to claim 22 in which the means for laying the first strand comprises clamping means, which locates and holds said first strand in the plane of its pre-established position and at an elevation enabling the next succeeding bale in the course of its formation to achieve the laying of the strand.

24. A mechanism according to claim 22 in which the means for metering the free end strands comprises an oscillating arm bearing a needle loop engaging hook and strand clamping means and said severing means is operable through the oscillation of the arm, the arm being oscillatable toward the needle loop to engage its hook with the loop and away from the needle loop to meter, to clamp and to sever the strands.

25. A mechanism according to claim 22 in which the means for laying the second free end strand comprises shuttle means traveling the length of the pre-established position of the second strand and having strand tensioning means engaging and conveying the second strand to its pre-established position.

26. A mechanism according to claim 22 in which the metering means includes a reciprocable hook traveling toward the needle loop to engage with the same and away from it to complete the metering of the free end strands and achieve their severing, together with means to clamp a severed end about the body of the hook.

27. A mechanism according to claim 22 in which the metering means includes a reciprocable hook movable toward the needle loop to engage with the same and away from it to meter the free end strands, which hook cooperates with the severing means to perform the severing function.

28. A mechanism according to claim 22 in which the strand metering means embodies a traveling free end clamp having a rest location substantially in the line of a pre-established strand position and a range of travel toward said needle loop to engage the clamp with the loop, away from the loop and beyond said rest location to complete the metering of said strands and clamp the terminal of one of them, and then back to its rest position with the strand terminal in its grip.

29. A mechanism according to claim 22 in which the metering means includes strand engaging means having a strand metering range of travel toward and away from said needle loop and said strand terminal severing means is activated through the travel of said strand engaging means to sever the metered strands.

30. A mechanism for knotting together free end strands of a loop about a bale comprising a pair of wrapping clamps at spaced points pre-establishing the overlapping positions for the tying of the knot, spaced rotatable means mounting and revolving said clamps to interwrap the strands in spaced regions, leaving an unwrapped region therebetween, means spreading strand portions apart in the region between wraps, means effecting lays of the strands in their pre-established positions in the wrapping clamps one on each side of said spreading means, and means movable between the spread strand portions and engageable with strand terminals to effect their insertion between said spread strand portions.

31. A mechanism according to claim 30 in which said spreading means is supported from above the axis of the knot and is pointed downwardly.

32. A mechanism according to claim 30 in which the spreading means is shiftable transversely of the medial plane of the lays from positions in that plane to positions respectively in either side thereof.

33. A mechanism according to claim 30 in which the spreading means is laterally shiftable, together with cam means to achieve said shifting.

34. A mechanism according to claim 30 in which the spreading means comprises a bar supported from above the axis of the knot, extending downwardly beyond it, and provided with an open ended slot in its main body through which the terminal inserting means operates.

35. A mechanism according to claim 1, in which shuttle means operating through the ring gears achieves the lay of one of the strands and the strand spreading means is shiftable into and out of the path of travel of said shuttle means to avoid fouling the shuttle and insure alignment of the lay.

36. A mechanism for knotting together the free end strands of a loop about a bale comprising a pair of wrapping clamps at spaced points pre-establishing overlapping positions of the lays of the strands for the tying of the knot, spaced rotatable means mounting and revolving said clamps to interwrap the strands, strand laying means which conveys the free end strands from the bale loop to the pre-established overlapped positions, and a bale case clamp near the base of each strand to fix the same against loop tension during the wrapping.

37. A mechanism according to claim 36 together with means to close one said bale case clamp about its strand at the inception of the strand laying operation, and the other said bale case clamp about its strand at the close of the strand laying operation, and to open both bale case clamps when the knot is complete.

38. A mechanism according to claim 22 in which said metering means includes a clamp gripping the terminal end of the first strand, and a bale case clamp gripping the same strand at its root, the first of which clamps is released following the engagement of the second.

39. A mechanism according to claim 6 in which strand underrest means is shiftable laterally into and out of the medial plane of the lays to under support the strands during the knotting operation.

40. A mechanism according to claim 6 in which strand under-rest means is movable radially between the rotatable means and relative to said spreading means.

41. A mechanism according to claim 1 embodying also strand under-rest means in the form of an arm having an upturned end and depending from an axis above the axes of the ring gears and to one side of the medial plane of the strands, said arm being swingable to bring its upward end beneath the strands during the knotting operation.

42. A mechanism according to claim 6 including means independent of the terminal inserting means to strip the completed knot from engagement with the spreading means.

43. A mechanism according to claim 6 including means to strip the knot from said spreading means upon its completion.

44. A mechanism according to claim 6 including means to strip the knot from said spreading means upon its completion which means are comprised of an arm pivoted below the axis of the knot and extending upwardly at one side of the plane of the strands but swingable downwardly to effect the disengagement.

45. A mechanism according to claim 6 including means to strip the knot from said spreading means upon its completion, and which means engage the main bodies of the strands on opposite sides of the knot from above.

46. A mechanism for knotting together the free end strands of a loop about a bale comprising a pair of strand wrapping clamps at spaced points establishing the overlapping positions of the strands for the tying of the knot, spaced rotatable means mounting and revolving said clamps to interwrap the strands in spaced regions leaving an unwrapped region therebetween, strand spreading means disposed between said clamps to spread apart and prevent wrapping of the strands in said unwrapped region, means movable between strand portions in the region between the wraps and engageable with strand terminals to effect their insertion between said strand portions, and strand laying means which conveys the free end strands from the bale loop to the established overlapping positions for the knotting, together with driving and control means comprising primary and secondary timing mechanisms, the operating cycles of which follow each other in succession, means for operating the strand laying devices from the primary mechanisms and means for operating the wrapping clamp from the secondary mechanism.

47. A mechanism according to claim 46 including bale case clamps for the bale ends of the strands which are closed by the primary mechanism and opened by the secondary mechanism.

48. A mechanism according to claim 46 in which lay control mechanisms are utilized to control the laid strands in their established positions during the knotting and such mechanisms are engaged with the strands by the primary timing mechanism and disengaged therefrom by the secondary mechanism.

49. A mechanism according to claim 46 in which a unitary control shaft is provided for the operation of all ancillary mechanisms and devices, which shaft is driven during the strand laying operations by the primary timing mechanism, and thereafter by the secondary timing mechanism.

50. A mechanism according to claim 46 in which the knot forming mechanism is geared to be driven by the secondary timing mechanism a number of revolutions in excess of those required for the number of wraps to complete the knot, and terminal mounting, knot stripping and lay control restoration devices operated from the secondary mechanism during the excess revolution of the wrapping mechanism in a cycle commenced before the last wrap is finished.

References Cited in the file of this patent

UNITED STATES PATENTS

| | | |
|---|---|---|
| 218,741 | Higgins | Aug. 19, 1879 |
| 808,153 | Heldt | Dec. 26, 1905 |
| 2,355,644 | Haase | Aug. 15, 1944 |
| 2,518,687 | Harvey | Aug. 15, 1950 |
| 2,528,538 | Nolt | Nov. 7, 1950 |